United States Patent
Hanzawa et al.

[11] Patent Number: 5,953,182
[45] Date of Patent: Sep. 14, 1999

[54] HEAD MOVING AND HOLDING MECHANISM FOR REVERSIBLE TAPE RECORDER

[75] Inventors: Hisashi Hanzawa; Hong-Seok Yang, both of Tokyo, Japan

[73] Assignee: Sony Corporation, Tokyo, Japan

[21] Appl. No.: 08/944,958

[22] Filed: Oct. 7, 1997

[30] Foreign Application Priority Data

| Oct. 9, 1996 | [JP] | Japan | 8-285878 |
| Oct. 9, 1996 | [JP] | Japan | 8-285879 |
| Oct. 9, 1996 | [JP] | Japan | 8-285880 |

[51] Int. Cl.$^6$ .................................................... G11B 5/54
[52] U.S. Cl. ........................................... 360/105; 360/96.6
[58] Field of Search .......................... 360/93, 96.1, 96.5, 360/96.6, 105

[56] References Cited

U.S. PATENT DOCUMENTS

| 5,229,897 | 7/1993 | Kimula et al. | 360/96.5 |
| 5,349,488 | 9/1994 | Shibata et al. | 360/105 |
| 5,359,478 | 10/1994 | Kawano | 360/96.6 |
| 5,646,799 | 7/1997 | Kuroda et al. | 360/96.6 |
| 5,764,433 | 6/1998 | Hanzawa et al. | 360/96.6 |

*Primary Examiner*—Brian E. Miller
*Attorney, Agent, or Firm*—Jay H. Maioli

[57] ABSTRACT

A magnetic recording and/or playback apparatus for use with a tape cassette, in which a magnetic tape is accommodated, includes a magnetic head, a switching mechanism and a head moving mechanism. The magnetic head is movable between a recording and/or playback position where the magnetic head contacts the magnetic tape in the tape cassette to record and/or play back information signals on and/or from the magnetic tape and a position where the magnetic head is spaced from the magnetic tape in the tape cassette. The switching mechanism switches over the running direction of the magnetic tape between forward direction and reverse direction. The head moving mechanism moves the magnetic head between the recording and/or playback position and the spaced position. The head moving mechanism includes a pair of holding portions for holding the magnetic head in the recording and/or playback position. The pair of holding portions hold the magnetic head such that when the magnetic tape is run in the forward direction by the switching mechanism, one of the pair of holding portions holds the magnetic head in the recording and/or playback position, and when the magnetic tape is run in the reverse direction by the switching mechanism, the other of the pair of holding portions holds the magnetic head in the recording and/or playback position.

22 Claims, 18 Drawing Sheets

HEAD MOVING AND HOLDING MECHANISM FOR REVERSIBLE TAPE RECORDER

BACKGROUND OF THE INVENTION

1. Field of the Invention

The present invention relates to a magnetic recording and/or playback apparatus. More particularly, the present invention relates to a magnetic recording and/or playback apparatus for use with a tape cassette.

2. Description of the Related Art

A magnetic recording and/or playback apparatus for use with a tape cassette requires that, in the recording and/or playback mode, a magnetic head for recording and/or playback be moved to a recording and/or playback position and locked in that position.

In such a magnetic recording and/or playback apparatus for use with a tape cassette, the magnetic head is moved by the same head moving member, regardless of whether a magnetic tape accommodated in the tape cassette runs in the forward or reverse direction, and is then locked in the recording and/or playback position by the same lock member.

With the magnetic recording and/or playback apparatus for use with a tape cassette wherein the magnetic head is moved to the recording and/or playback position by the same head moving member and then locked there by the same lock member when the magnetic tape is run in the opposite directions in the recording and/or playback mode, however, there occurs a problem in reliability of operation; i.e., the stop position of the magnetic head is not stabilized, or the magnetic head cannot be released from the locked state.

Another problem in the above magnetic recording and/or playback apparatus for use with a tape cassette is that if a battery is completely consumed or a power failure occurs in the recording and/or playback mode, the tape cassette could not be removed unless supply of power is resumed upon replacement of the battery or restoration from the power failure.

In the recording and/or playback mode, the magnetic head is held in contact with the magnetic tape. If the tape cassette is removed during such a state, the magnetic tape or the magnetic head may be damaged. To avoid this problem, the magnetic recording and/or playback apparatus for use with a tape cassette is constructed such that the tape cassette cannot be removed unless supply of power is resumed and the apparatus is set to the stop mode to move the magnetic head away from the magnetic tape.

But it is very inconvenient that the tape cassette can be removed only after replacement of the battery or restoration from the power failure. On the other hand, removing the tape cassette forcibly may lead to a problem that the magnetic tape, or the magnetic head are damaged.

Further, in the above magnetic recording and/or playback apparatus for use with a tape cassette, a pair of capstans are driven for rotation by a driving belt to run the magnetic tape while it is gripped between the pair of capstans and a pair of pinch rollers.

Tension of the driving belt is set to a value suitable for producing torque necessary for running the magnetic tape at a high speed required in the rewind or fast forward mode, for example, where a drive motor is subjected to a heavier load. The motor therefore consumes more power due to the lateral pressure loss resulting from the tension of the driving belt.

This raises a problem that, in the apparatus using a battery as a power supply, the battery life is shortened.

SUMMARY OF THE INVENTION

It is therefore an object of the present invention to provide a magnetic recording and/or playback apparatus which resolves the above-mentioned problems.

According to the present invention, there is provided a magnetic recording and/or playback apparatus. The apparatus uses a tape cassette in which a magnetic tape is accommodated. The apparatus includes a magnetic head, a switching mechanism and a head moving mechanism. The magnetic head is movable between a recording and/or playback position where the magnetic head contacts the magnetic tape in the tape cassette to record and/or play back information signals on and/or from the magnetic tape and a position where the magnetic head is spaced from the magnetic tape in the tape cassette. The switching mechanism switches over the running direction of the magnetic tape between forward direction and reverse direction. The head moving mechanism moves the magnetic head between the recording and/or playback position and the spaced position. The head moving mechanism includes a pair of holding portions for holding the magnetic head in the recording and/or playback position. The pair of holding portions holds the magnetic head such that when the magnetic tape is run in the forward direction by the switching mechanism, one of the pair of holding portions holds the magnetic head in the recording and/or playback position, and when the magnetic tape is run in the reverse direction by the switching mechanism, the other of the pair of holding portions holds the magnetic head in the recording and/or playback position.

According to the present invention, there is provided a magnetic recording and/or playback apparatus. The apparatus uses a tape cassette in which a magnetic tape is accommodated. The apparatus includes a magnetic head, a switching mechanism, a body, a lid, a lock mechanism and an unlock mechanism. The magnetic head is movable between a recording and/or playback position where the magnetic head contacts the magnetic tape in the tape cassette to record and/or play back information signals on and/or from the magnetic tape and a position where the magnetic head is spaced from the magnetic tape in the tape cassette. The switching mechanism switches over the running direction of the magnetic tape between forward direction and reverse direction. The body receives a tape cassette to be loaded therein, and houses the magnetic head and the switching mechanism therein. The lid is pivotally attached to the body. The lock mechanism locks the lid in a closed position with respect to the body. The unlock mechanism releases the lid from the state locked by the lock mechanism and moves the magnetic head to the spaced position.

According to the present invention, there is provided a magnetic recording and/or playback apparatus. The apparatus uses a tape cassette in which a magnetic tape is accommodated. The apparatus includes a motor, a pair of capstans, a pair of pinch rollers, a pair of flywheels, an endless belt and an adjust mechanism. The motor has a driving pulley provided on a rotary shaft of the motor. The pair of pinch rollers cooperate with the pair of capstans to grip the magnetic tape therebetween for running the magnetic tape. The pair of flywheels are provided respectively on the pair of capstans. The endless belt is stretched to run around the driving pulley and the pair of flywheels. The adjust mechanism adjusts tension of the endless belt such that the tension of the endless belt in a mode of running the magnetic tape at a high speed is weaker than the tension of the endless belt in a mode of running the magnetic tape at a low speed.

According to the present invention, there is provided a magnetic recording and/or playback apparatus. The apparatus uses a tape cassette in which a magnetic tape is accommodated. The apparatus includes a magnetic head, a switching mechanism, a head moving mechanism, an apparatus body, a lid, a lock mechanism and an unlock mechanism. The magnetic head is movable between a recording and/or playback position where the magnetic head contacts the magnetic tape in the tape cassette to record and/or play back information signals on and/or from the magnetic tape and a position where the magnetic head is spaced from the magnetic tape in the tape cassette. The switching mechanism switches over the running direction of the magnetic tape between forward direction and reverse direction. The head moving mechanism moves the magnetic head between the recording and/or playback position and the spaced position. The head moving mechanism includes a pair of holding portions for holding the magnetic head in the recording and/or playback position. The pair of holding portions holds the magnetic head such that when the magnetic tape is run in the forward direction by the switching mechanism, one of the pair of holding portions holds the magnetic head in the recording and/or playback position, and when the magnetic tape is run in the reverse direction by the switching mechanism, the other of the pair of holding portions holds the magnetic head in the recording and/or playback position. The apparatus body houses the magnetic head, the switching mechanism and the head moving mechanism therein. The tape cassette is loaded in the apparatus body. The lid is pivotally attached to the apparatus body. The lock mechanism locks the lid in a closed position with respect to the apparatus body. The unlock mechanism releases the lid from the state locked by the lock mechanism and moves the magnetic head to the spaced position.

DESCRIPTION OF THE PREFERRED EMBODIMENT

An embodiment of a magnetic recording and/or playback apparatus according to the present invention will be described below in detail with reference to the drawings. In the following embodiment, the present invention is applied to, by way of example, a portable magnetic-tape playback apparatus (referred to simply as a tape player hereinafter) for use with a tape cassette in which a magnetic tape is accommodated as a recording medium.

Figure 1:
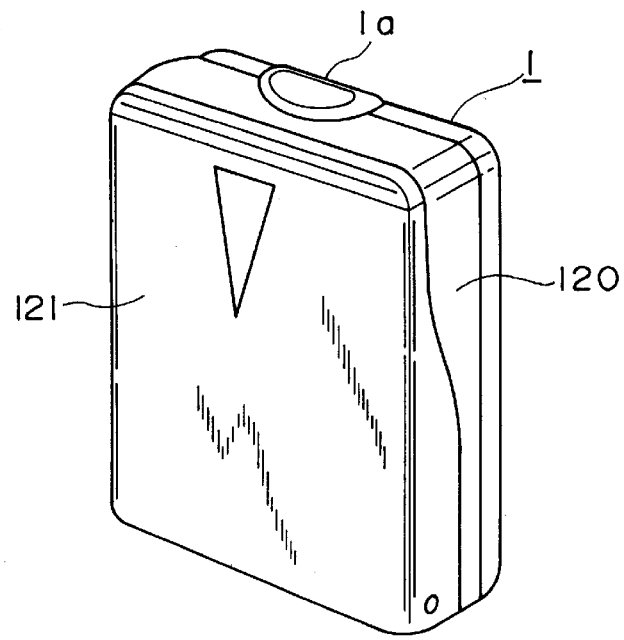
FIG. 1 is a perspective view showing an appearance of a tape player, the view illustrating which a magnetic recording and/or playback apparatus for use with a tape cassette is applied to the tape player.
Figure 2A:
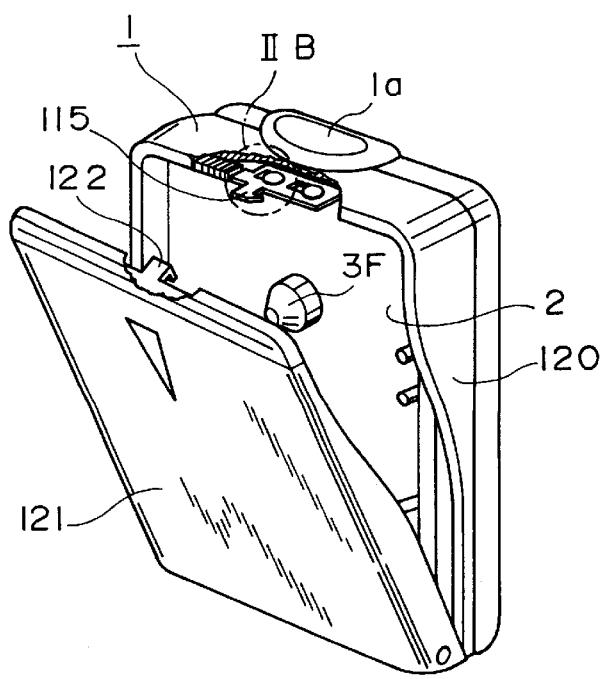
FIG. 2A is a perspective view showing the tape player with a lid open.
Figure 2B:
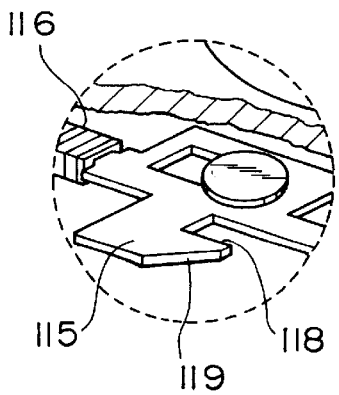
FIG. 2B is an enlarged view of a portion IIB in FIG. 2A.

A tape player 1 according to the embodiment of the present invention comprises, as shown in FIG. 1, a housing 120 having an overall size slightly larger than the size of a Phillips type tape cassette, and a lid 121. The housing 120 is substantially in the form of a rectangular parallelepiped and has a tape cassette loading recess formed on one side for allowing a tape cassette to be loaded therein. In the recess of the housing 120, there are arranged a pair of reel mounts projecting out of an inner bottom surface of the recess, a pair of pinch rollers, a pair of capstans (these components being described later), etc. The lid 121 is angularly movably supported by the housing 120 in such a manner as to be able to open and close the recess of the housing 120. To this end, as shown in FIG. 2A, the lid 121 is pivotally attached to one short side of the housing 120. The lid 121 is always urged by an urging mechanism (not shown) in the direction to come into a state of FIG. 2A where the recess of the housing 120 is opened. Also, as shown in FIGS. 1, 2A and 2B, the tape player 1 is provided with an operating button 1a for pressing an operating portion of an eject mechanism (described later). Though not shown, the tape player 1 is further provided with a plurality of operating buttons for setting and changing over various modes (described later), a headphone jack, a volume control for adjusting sound volume, etc. The tape cassette is inserted into a holder (not shown) and loaded in the recess of the housing 120 upon the lid 121 pivoting into a closed state. At this time, the pair of reel mounts are engaged in a pair of tape reels of the tape cassette, respectively.

The tape player 1 includes a mechanism chassis 2, as shown in FIG. 2A. A tape driving system will be first described.

Figure 3:
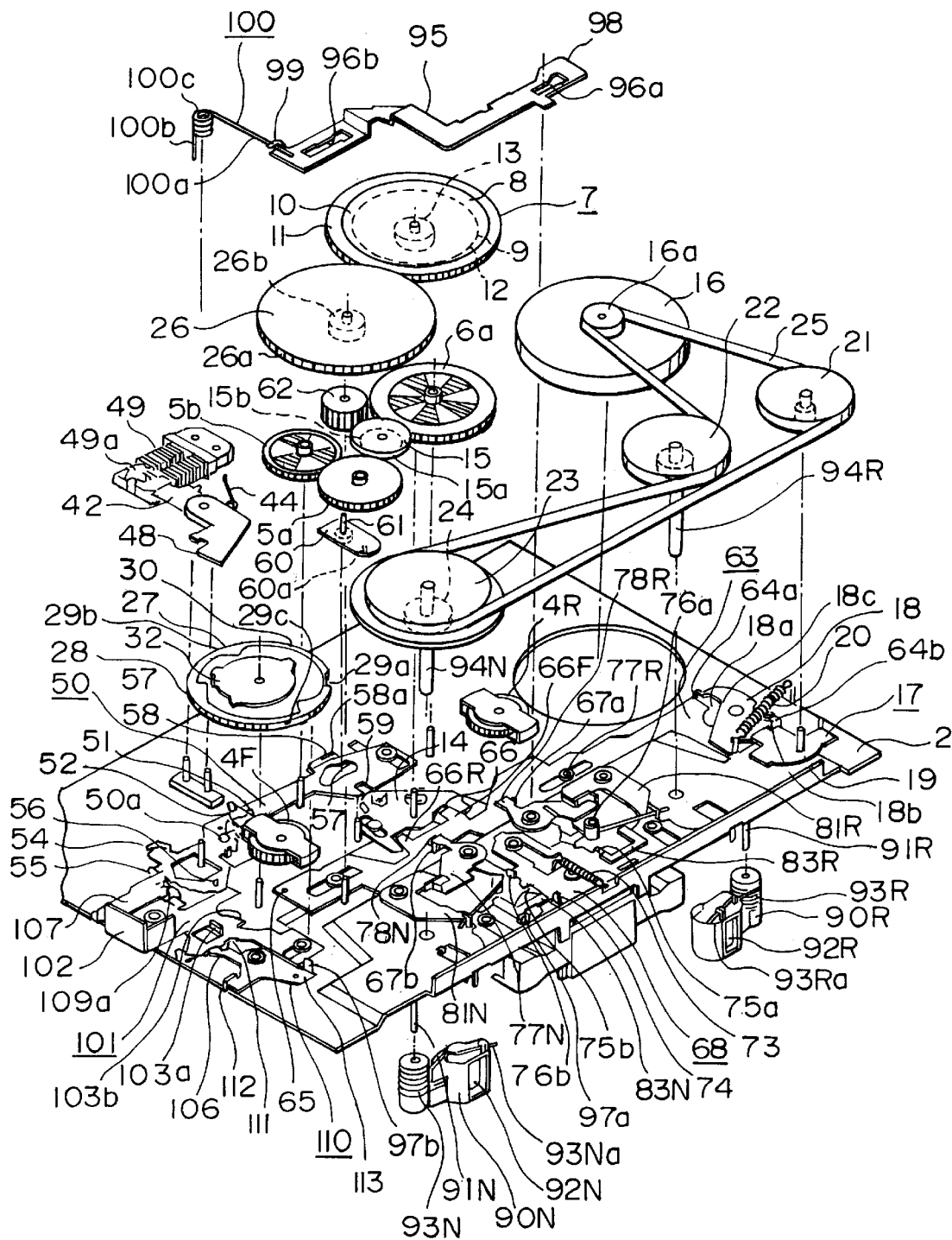
FIG. 3 is an exploded perspective view of a mechanism section.
Figure 4:
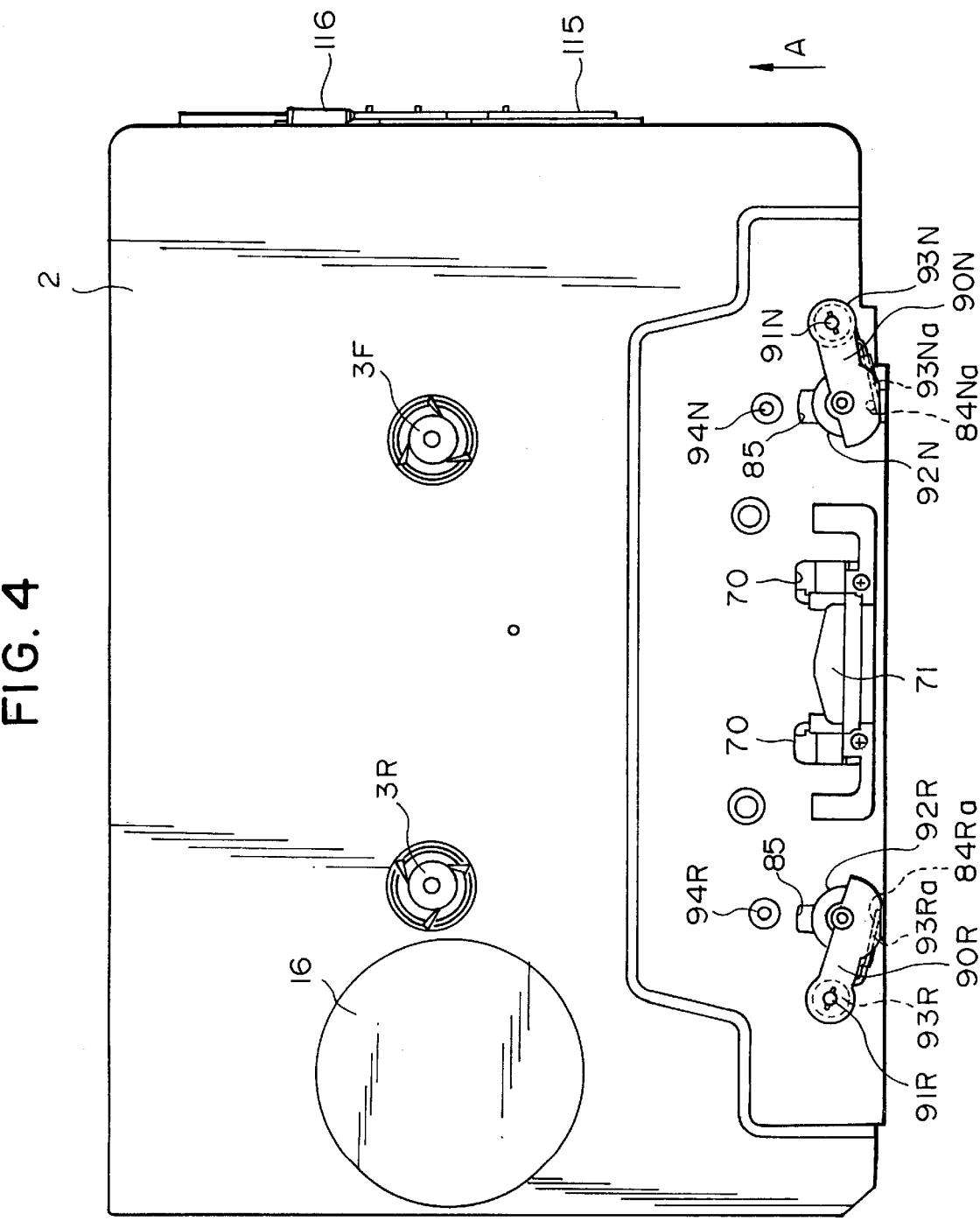
FIG. 4 is a plan view of the mechanism section.
Figure 5:
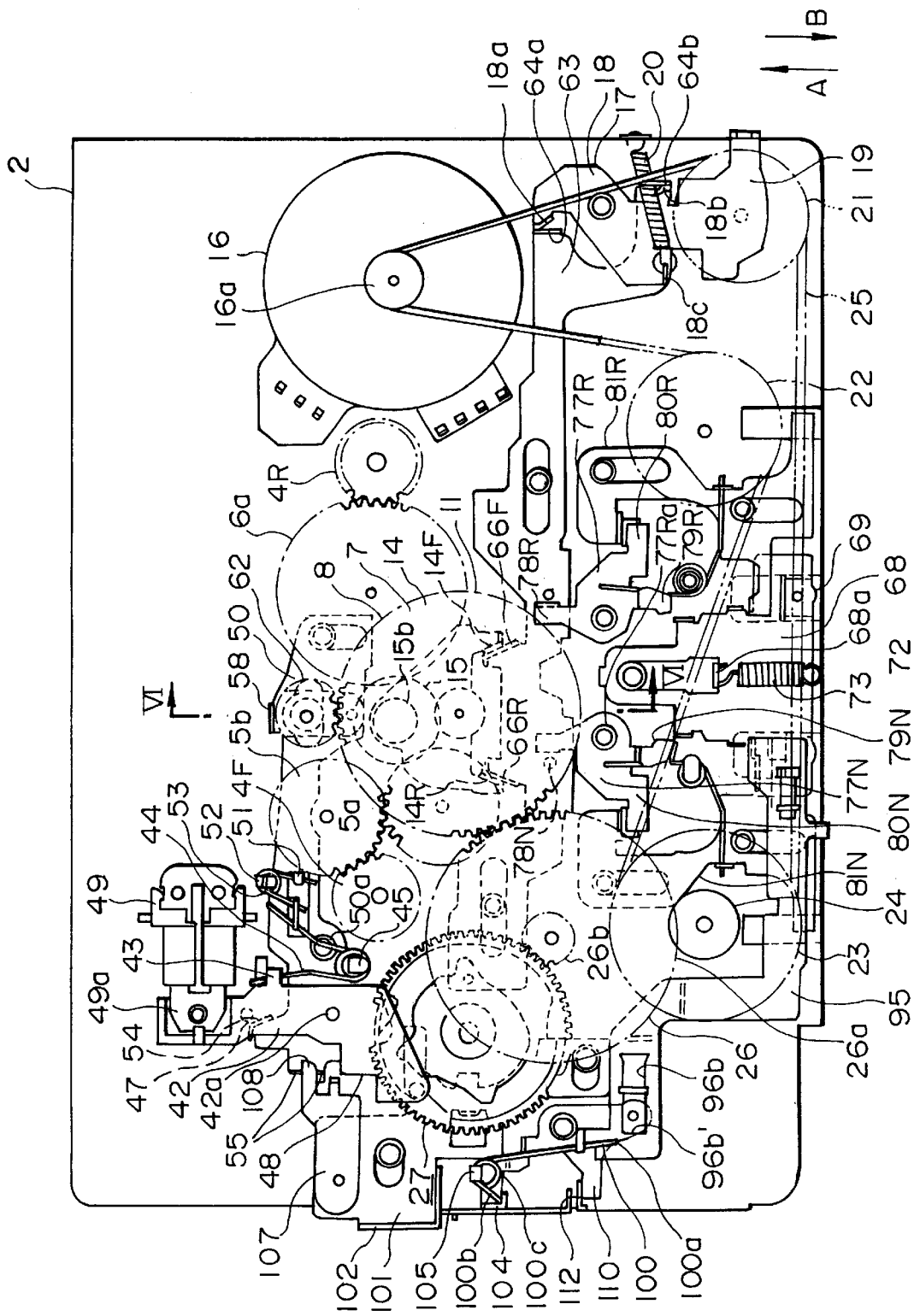
FIG. 5 is a bottom view of the mechanism section.

As shown in FIG. 4, a pair of reel mounts 3F, 3R are rotatably disposed substantially in a central portion of an upper surface of the mechanism chassis 2 at positions spaced in the left and right direction. As shown in FIGS. 3 and 5, gears 4F, 4R provided at respective base ends of the reel mounts 3F, 3R are disposed on the underside of the mechanism chassis 2. One 5b of relay gears 5a, 5b held in mesh with each other meshes the gear 4F of the reel mount 3F, and a relay gear 6a meshes the gear 4R of the reel mount 3R. The pair of reel mounts 3F, 3R come into engagement with the pair of tape reels, respectively, around which the magnetic tape in the tape cassette loaded into the tape player 1 is wound.

As shown in FIGS. 3 and 5, a clutch 7 is rotatably supported in a position between the relay gears 5a and 6a. The clutch 7 is made up of a main gear 8 and a magnet gear 9. The main gear 8 comprises a disk 10 made of a magnetic substance and a gear portion 11 formed along a peripheral edge of the disk 10 using a synthetic resin. The magnet gear 9 is entirely made of a magnetic material, and comprises a circular clutch plate 12 sized to be internally fitted to an upper surface of the clutch plate 12 and a gear portion 13 projecting above the upper surface of the clutch plate 12 at the center. The main gear 8 and the magnet gear 9 are rotatably supported by the mechanism chassis 2 in a coaxially superposed state.

Figure 6:
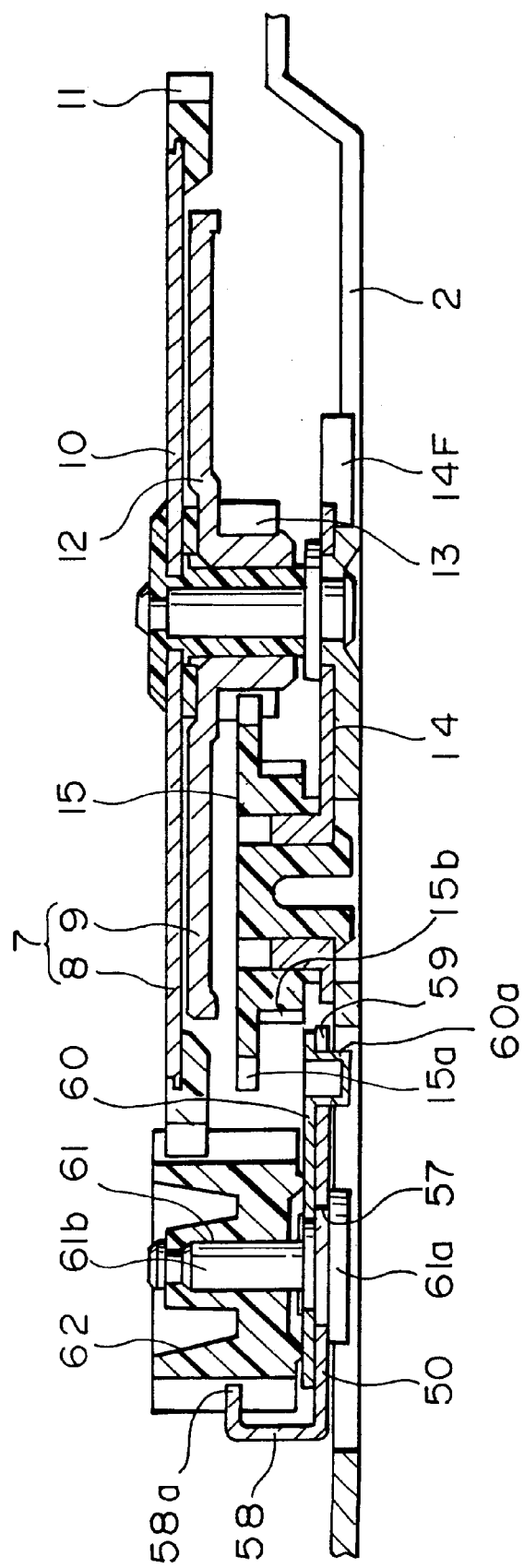
FIG. 6 is an enlarged sectional view taken along line 6—6 in FIG. 5.

As shown in FIG. 6, an NR switching lever 14 is pivotally supported to the underside of the mechanism chassis 2 and locates above the clutch 7 in coaxial relation to the clutch 7. A trapezoidal cutout is formed along a front edge of the NR switching lever 14, and pressed lugs 14F, 14R are erected respectively at left and right side edges of the cutout, as best clearly shown in FIG. 9. An NR switching gear 15 is rotatably supported to the underside of the NR switching lever 14 at its rear end portion. The NR switching gear 15 comprises a large gear 15a and a small gear 15b integrally formed into one piece, the large gear 15a meshing the gear portion 13 of the magnet gear 9 of the clutch 7.

As shown in FIGS. 3 and 5, a motor 16 is fixed to the underside of the mechanism chassis 2, and a pulley 16a is fixed over a rotary shaft of the motor 16 projecting downward.

A tension lever 17 is pivotally supported to the underside of the mechanism chassis 2. The tension lever 17 comprises a centering portion 18 and a pulley support portion 19 constituting a front half, both the portions being integrally formed into one piece. The centering portion 18 is rotatably supported substantially at its center to the mechanism chassis 2. Abutting lugs 18a, 18b are vertically projected downward at rear and front ends of the centering portion 18, respectively, and a tension coil spring 20 is stretched between a spring catch lug 18c formed at an opposite front end of the centering portion 18 and the mechanism chassis 2. The tension coil spring 20 applies pivoting force to always urge the tension lever 17 clockwise as viewed from above (below on the drawing sheet of FIG. 3). A tension pulley 21 is rotatably supported to the underside of the pulley support portion 19 of the tension lever 17.

A plurality of flywheels 22, 23 each having a groove formed in its outer peripheral surface for fitting of a belt thereto are rotatably supported to the underside of the mechanism chassis 2. A gear portion 24 is integrally formed on an upper surface of the flywheel 23 located on the right (left on the drawing sheets of FIGS. 3 and 5) side. An endless driving belt 25 made of rubber, for example, is stretched to run around the pulley 16a of the motor 16, the tension pulley 21 and the flywheels 22, 23. The later-described capstans are provided one on each of the flywheels 22, 23.

A driving gear 26 is rotatably supported to the underside of the mechanism chassis 2 between the flywheel 23 and the clutch 7. The driving gear 26 comprises a large gear 26a and a small gear 26b integrally formed into one piece, the large gear 26a meshing both the gear portion 24 of the flywheel 23 and the main gear 8 of the clutch 7.

When the motor 16 is driven, the flywheel 23 is rotated through the driving belt 25, whereupon the driving gear 26 held in mesh with the gear portion 24 of the flywheel 23 and the main gear 8 of the clutch 7 held in mesh with the driving gear 26 are rotated. Then, the magnet gear 9 is rotated by virtue of viscosity acting between the disk 10 of the main gear 8 and the clutch plate 12 of the magnet gear 9, causing the NR switching gear 15 held in mesh with the gear portion 11 of the magnet gear 9 to rotate.

A mode establishing system for establishing various modes such as a stop mode, a forward playback mode, a reverse playback mode, and an AMS mode will be described below.

A cam gear 27 serves as a primary part of the mode establishing system. As shown in FIG. 5, the cam gear 27 is rotatably supported to the underside of the mechanism chassis 2. A peripheral edge portion of the cam gear 27 is formed into a gear portion 28 and, as shown in FIGS. 7 and 8, the gear portion 28 includes three no-tooth areas 29a, 29b, 29c, where gear teeth are eliminated, with appropriate intervals therebetween.

Figure 8:
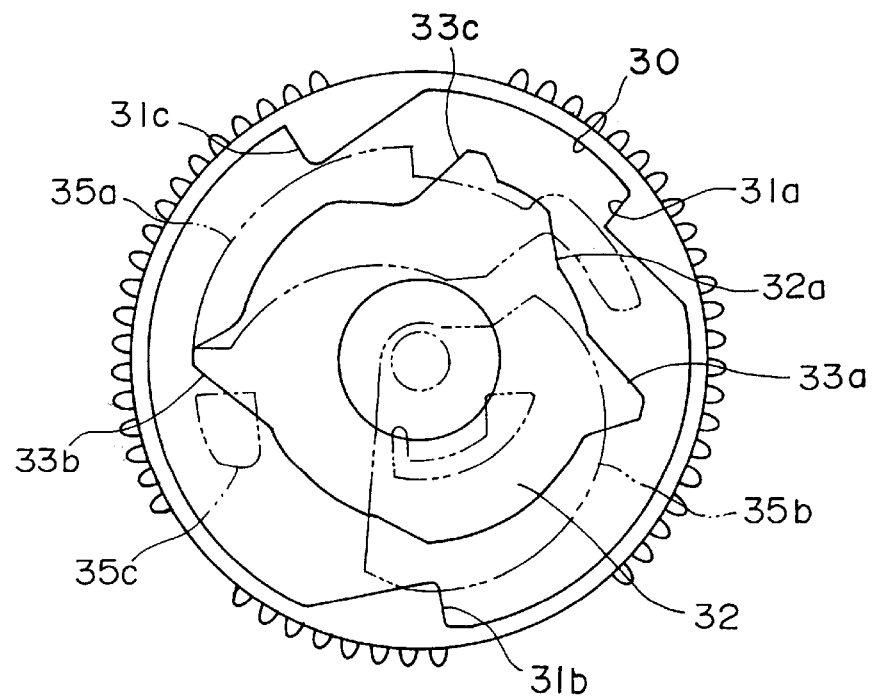
FIG. 8 is an enlarged view of a bottom surface of the cam gear, looking from above.

As shown in FIG. 8, on the underside of the cam gear 27, there are formed a peripheral wall 30 along its peripheral edge and three stop surfaces 31a, 31b, 31c extending from an inner surface of the peripheral wall 30 toward the center and facing in the counterclockwise direction as viewed from above the cam gear 27 (i.e., looking from the observer of the drawing). Ends of the stop surfaces 31a, 31b, 31c nearer to the center are each continuously joined to the inner surface of the peripheral wall 30 through a slope. The stop surface 31a is formed in a position spaced clockwise from the no-tooth area 29b to some extent, the stop surface 31b is formed in a position corresponding to a clockwise end of the no-tooth area 29c, and the stop surface 31c is formed in a position spaced a little counterclockwise from the no-tooth area 29b.

A projection 32 having the same height as the peripheral wall 30 is formed on the underside of the cam gear 27 at the center, and has return slopes 33a, 33b, 33c each coming closer to the peripheral wall 30 as an outer peripheral surface of the projection 32 advances clockwise along the slope. The outer peripheral surface of the projection 32 except the return slopes 33a, 33b, 33c is spaced an appropriate distance from the inner surface of the peripheral wall 30, the stop surfaces 31a, 31b, 31c, and the slopes continued from the stop surfaces. The return slope 33a is formed in a position corresponding to a terminated end of the slope continued from the stop surface 31a, the return slope 33b is formed in a position corresponding to substantially the middle between the stop surfaces 31b and 31c, and the return slope 33c is formed in a position corresponding to a terminated end of the slope continued from the stop surface 31c. The outer peripheral surface of the projection 32 returns toward the center immediately from terminated ends of the return slopes 33a, 33b, 33c. Additionally, the outer peripheral surface of the projection 32 includes an initial urging surface 32a formed in a position facing the stop surface 31a as a slope displacing toward the center with advance in the clockwise direction.

Figure 7:
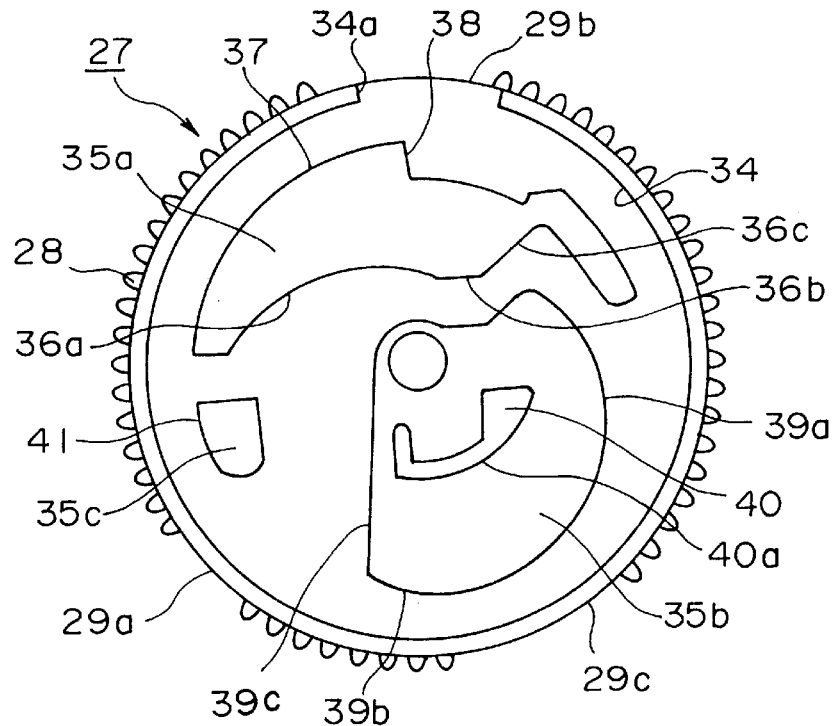
FIG. 7 is an enlarged plan view of a cam gear.

As shown in FIG. 7, on an upper surface of the cam gear 27, there are formed a peripheral wall 34 along its peripheral edge and a cutout 34a in a position of the peripheral wall 34 substantially corresponding to the no-tooth area 29b. Thee projections 35a, 35b, 35c having the same height as the peripheral wall 34 are formed inwardly of the peripheral wall 34. A surface of the projection 35a facing the center includes a pulling surface 36a displacing toward the center with advance in the clockwise direction, a first acting surface 36b continuously extending from a clockwise end of the pulling surface 36a and displacing toward the outer periphery with advance in the clockwise direction, and a second acting surface 36c continuously extending from a clockwise end of the first acting surface 36b and displacing toward the outer periphery at a steeper angle than the first acting surface 36b with advance in the clockwise direction. An outer peripheral surface of the projection 35a serves as a check surface. A permissive portion 38 in the form of a surface displacing nearer to the center than the check surface 37 is formed at an end of the check surface 37 in a position slightly offset clockwise with respect to the no-tooth area 29b. An outer peripheral surface of the projection 35b includes a pushing surface 39a displacing toward the outer periphery with advance in the clockwise direction, and an acting surface 39b continuously extending from a clockwise end of the pushing surface 39a and displacing toward the center with advance in the clockwise direction. A check boss 40 is erected on an upper surface of the projection 35b, and an outer peripheral surface 40a of the check boss 40 serves as a check surface. An outer peripheral surface 41 of the projection 35c serves as a check surface.

As shown in FIGS. 3 and 5, a trigger lever 42 is pivotally supported substantially at the middle thereof to the underside of the mechanism chassis 2 in a position opposite to one side of the cam gear 27 where the later-described magnetic head is disposed. A torsional coil spring 44 is stretched between a portion of the trigger lever 42 rearward of a pivot point 42a thereof and a spring catch lug 43 formed by cutting and raising part of the mechanism chassis 2. The torsional coil spring 44 applies pivoting force to always urge the trigger lever 42 clockwise as viewed from above (below on the drawing sheet of FIG. 3). A coil portion of the torsional coil spring 44 is fitted over and supported by a spring support lug 45 formed by cutting and raising part of the mechanism chassis 2.

Figure 9:
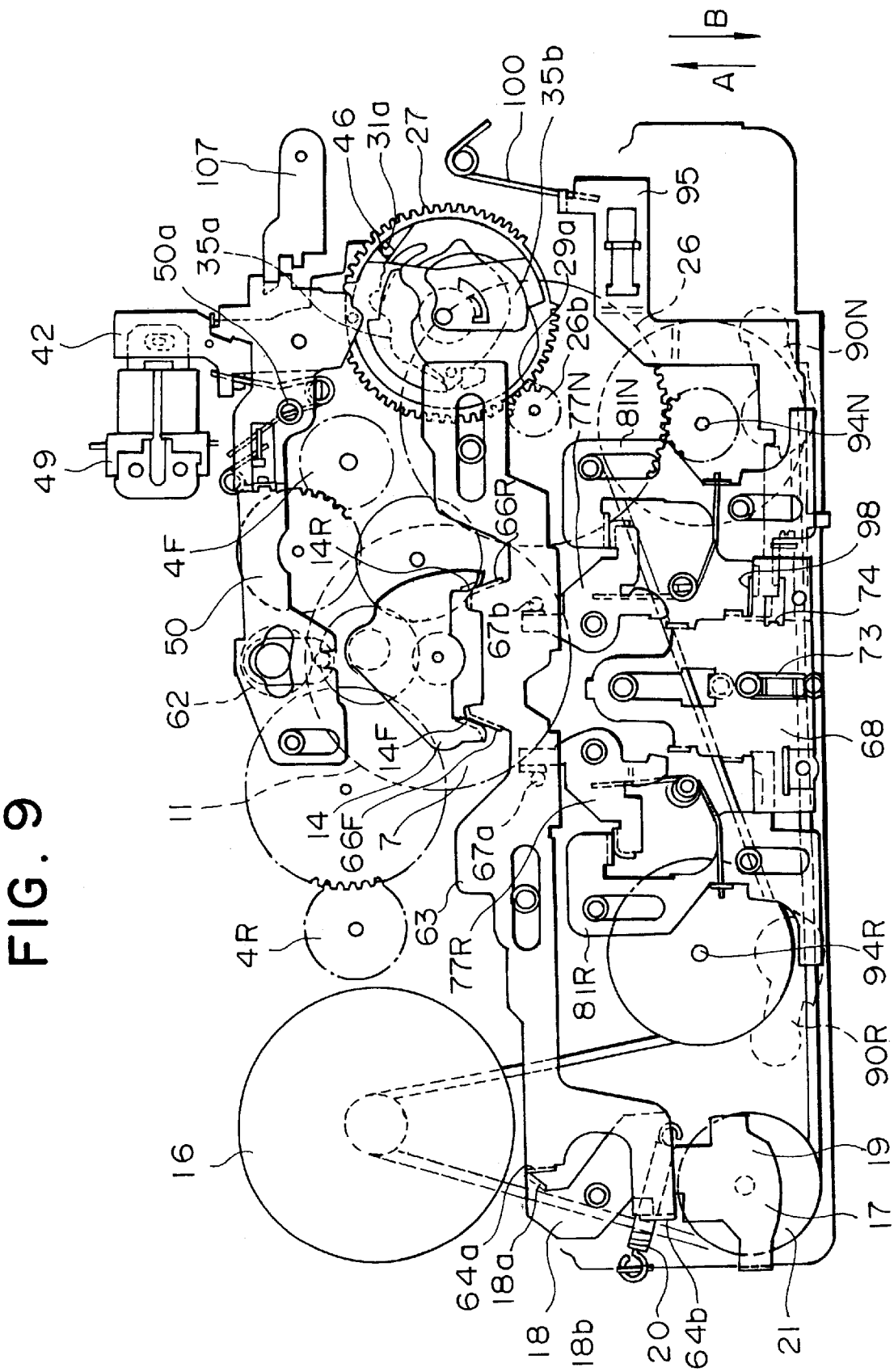
FIG. 9 is a plan view, partly omitted, of primary elements to show various modes together with FIGS. 10 to 15, the view illustrating a stop mode.

An acting boss 46 is projected on the upper surface of the trigger lever 42 at its front end. The acting boss 46 is, as shown in FIG. 9, positioned between the peripheral wall 30 and the projection 32 of the cam gear 27. The trigger lever 42 also has a pressing boss 47 projected on the upper surface thereof in a position relatively nearer to its rear end, and a right side edge 48 positioned near its front end to serve as a pressed portion.

A solenoid 49 is fixed to the underside of the mechanism chassis 2 in a position near the trigger lever 42. An acting piece 49a of the solenoid 49 is retracted when the solenoid is not excited, and protruded to the right (left end in FIGS. 3 and 5) when excited. The rear end of the trigger lever 42 is pivotally coupled to a right end of the acting piece 49a of the solenoid 49.

As shown in FIGS. 3 and 5, an FR lever 50 being long substantially in the left and right direction is pivotally supported in its portion 50a offset to the right (left in FIGS. 3 and 5) from the center thereof to the underside of the mechanism chassis 2 in a position slightly deviated to the left (right in FIGS. 3 and 5) from the pivot point 42a of the trigger lever 42. A torsional coil spring 53 is stretched between a spring catch lug 51 formed in a position slightly deviated to the left from the pivot point 50a of the FR lever 50 and the spring catch lug 43 with a coil portion supported by a spring support lug 52 formed behind the spring catch lug 51 of the FR lever 50. The torsional coil spring 53 applies pivoting force to always urge the FR lever 50 in the counterclockwise direction.

As shown in FIG. 3, a pressed portion 54 being substantially hook-shaped is vertically projected downward (upward on the drawing sheet) from a rear edge of the FR lever 50 at its right end portion. Holding lugs 55, 55 are vertically projected downward from a right edge of the FR lever 50 with some distance therebetween in the back and forth direction. A controlled boss 56 is vertically projected downward from a front end portion of the FR lever 50 at its right end portion. The controlled boss 56 is positioned to face part of the upper surface of the cam gear 27 near the peripheral edge.

A substantially corner-rounded-triangular hole 57 being long in the left and right direction and having a central portion bulged rearward is formed in a left end portion of the FR lever 50. A wall 58 is vertically projected downward from the rear edge of the FR lever 50 in a position corresponding to the central portion of the hole 57. A wedge-shaped control boss 58a is formed in a front surface of the wall 58, and a cutout 59 is formed to be open forward at a front edge of the FR lever 50 in a position corresponding to the central portion of the hole 57.

Figure 14:
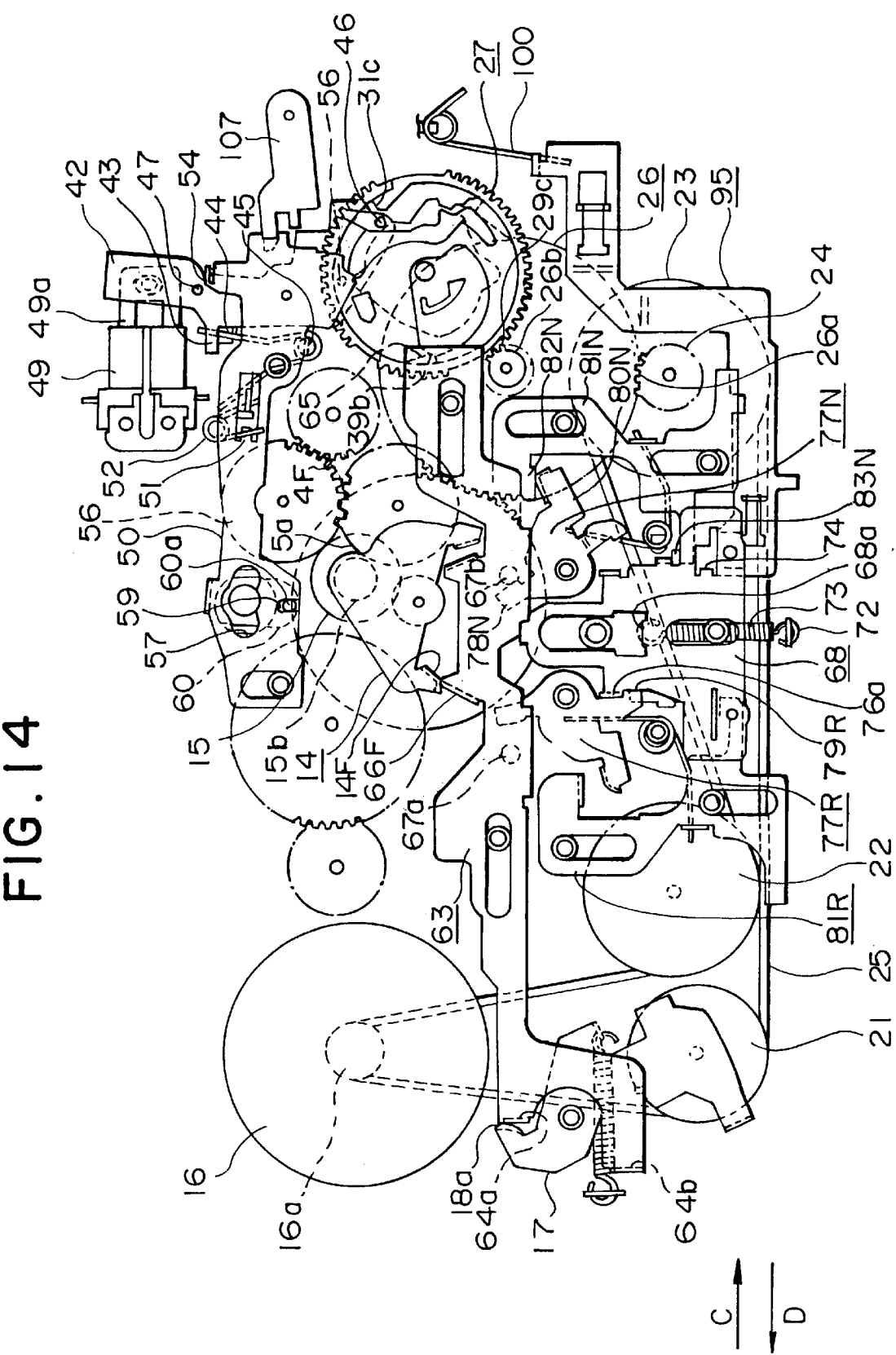
FIG. 14 is a plan view showing a state immediately after the plunger is excited from the forward playback mode.
Figure 15:
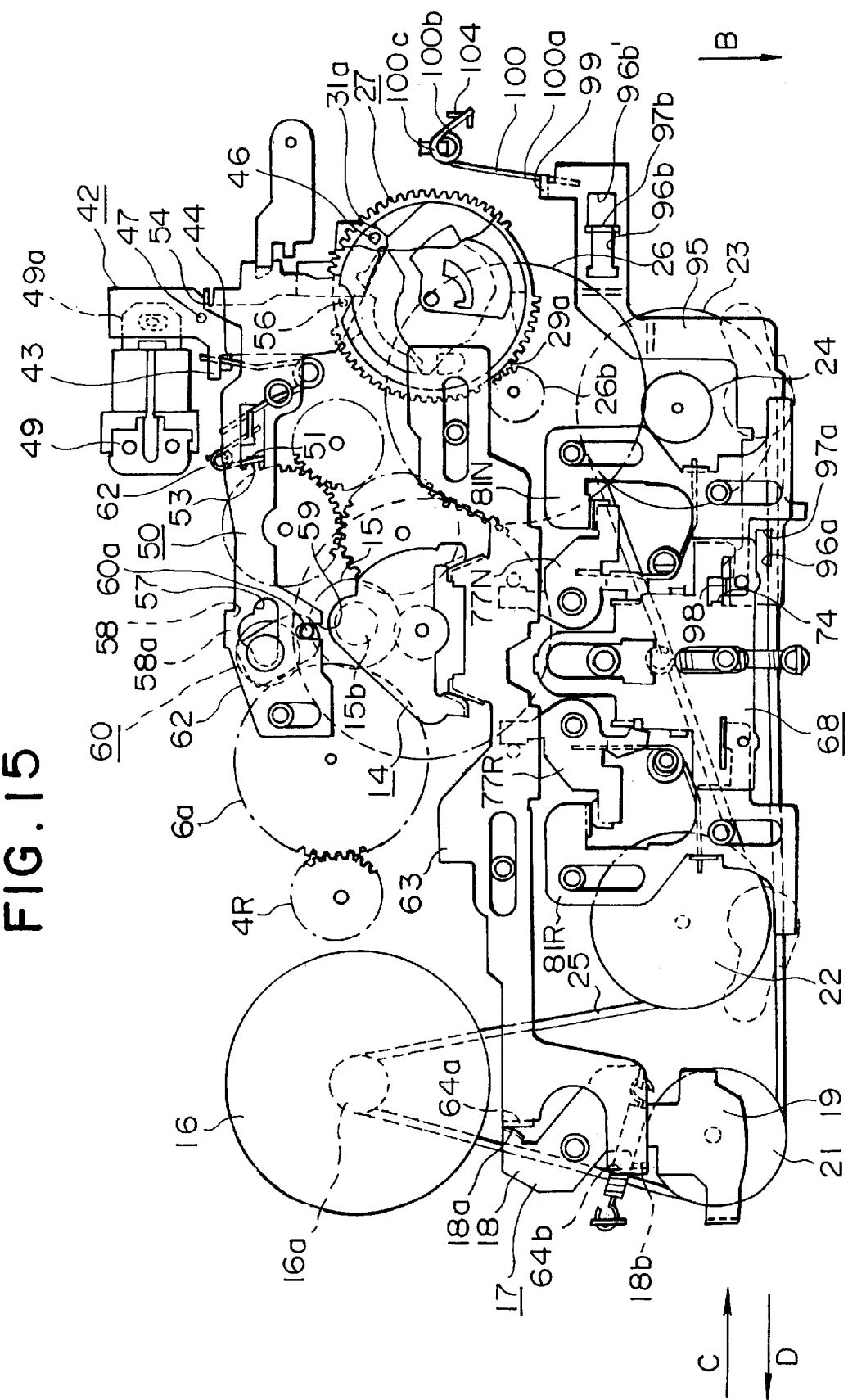
FIG. 15 is a plan view showing an AMS (Auto Music Scan) mode.

As shown in FIGS. 3, 14 and 15, an FR swing lever 60 is supported to the left end portion of the FR lever 50. The FR swing lever 60 is somewhat long in the back and forth direction. An engagement boss 60a is projected upward at its front end by chasing and is engaged in the cutout 59 of the FR lever 50 from below to be slidable in the back and forth direction. A shaft pin 61 is fixed to a rear end portion of the FR swing lever 60 such that a head 61a of the shaft pin 61 and the FR swing lever 60 hold an opening edge of the hole 57 in the FR lever 50 therebetween from above and below, respectively. The FR swing lever 60 is thereby supported by FR lever 50 to be able to swing in the left and right direction over a range defined by the hole 57 with a position where the engagement boss 60a and the cutout 59 engage with each other serving as a fulcrum. As shown in FIG. 9, an FR gear 62 is rotatably supported on a shaft portion 61b of the shaft pin 61 projecting downward from the FR swing lever 60.

When the solenoid 49 is not excited and the controlled boss 56 of the FR lever 50 is positioned in the cutout 34a of the peripheral wall 34 on the upper surface of the cam gear 27, the FR lever 50 is positioned at an end of its pivotable range in the counterclockwise direction under the pivoting force applied from the torsional coil spring 53. In this state, the FR gear 62 meshes the gear portion 11 of the main gear 8 of the clutch 7. This meshing causes the FR swing lever 60 to move rearward to some extent such that the head 61a of the shaft pin 61 is positioned in the rearward bulged portion of the hole 57 and the FR gear 62 engages the controlled boss 58a of the FR lever 50.

When the main gear 8 of the clutch 7 is rotated counterclockwise, the FR gear 62 meshing the main gear 8 receives rotating force in the clockwise direction. Because of the FR gear 62 engaging the control boss 58a of the FR lever 50, the FR swing lever 60 is forced to swing counterclockwise, whereupon the FR gear 62 comes into mesh with the relay gear 6a to rotate it counterclockwise. As a result, the reel mount 4R is rotated at a high speed in the rewind direction. Conversely, when the main gear 8 is rotated clockwise, the FR gear 62 receives rotating force in the counterclockwise direction and the FR swing lever 60 is forced to swing clockwise, whereupon the FR gear 62 comes into mesh with the relay gear 5b. As a result, the reel mount 4F is rotated at a high speed in the fast forward direction.

When the solenoid 49 is excited, the trigger lever 42 pivots clockwise as viewed from above (below in FIG. 3 or the observer of FIG. 14), whereupon the pressing boss 47 of the trigger lever 42 pushes the pressed portion 54 of the FR lever 50 forward rightward, causing the FR lever 50 to pivot clockwise against the resilient force of the torsional coil spring 53. The FR gear 62 is thus released from mesh with the gear portion 11 of the main gear 8 of the clutch 7. With the continued counterclockwise rotation of the cam gear 27, the controlled boss 56 of the FR lever 50 comes into slide contact with an inner surface of the peripheral wall 34 on the upper surface of the cam gear 27, whereby the FR lever 50 is held in a state having pivoted clockwise.

As shown in FIGS. 3 and 5, an NR slider 63 being long in the left and right direction is slidably supported to the underside of the mechanism chassis 2. Two abutting lugs 64a, 64b are vertically projected downward at one end of the NR slider 63 in positions spaced from each other. One abutting lug 64b is located nearer to a side edge of the mechanism chassis 2 than the other abutting lug 64a. The other abutting lug 64a is opposed to the rearward abutting lug 18a of the tension lever 17, and the one abutting lug 64b is opposed to the forward abutting lug 18b of the tension lever 17. Under the condition where no other force is applied to the NR slider 63, the abutting lugs 18a, 18b of the tension lever 17 contact the abutting lugs 64a, 64b of the NR slider 63, respectively, thereby holding the NR slider 63 in a neutral state or position.

Figure 11:
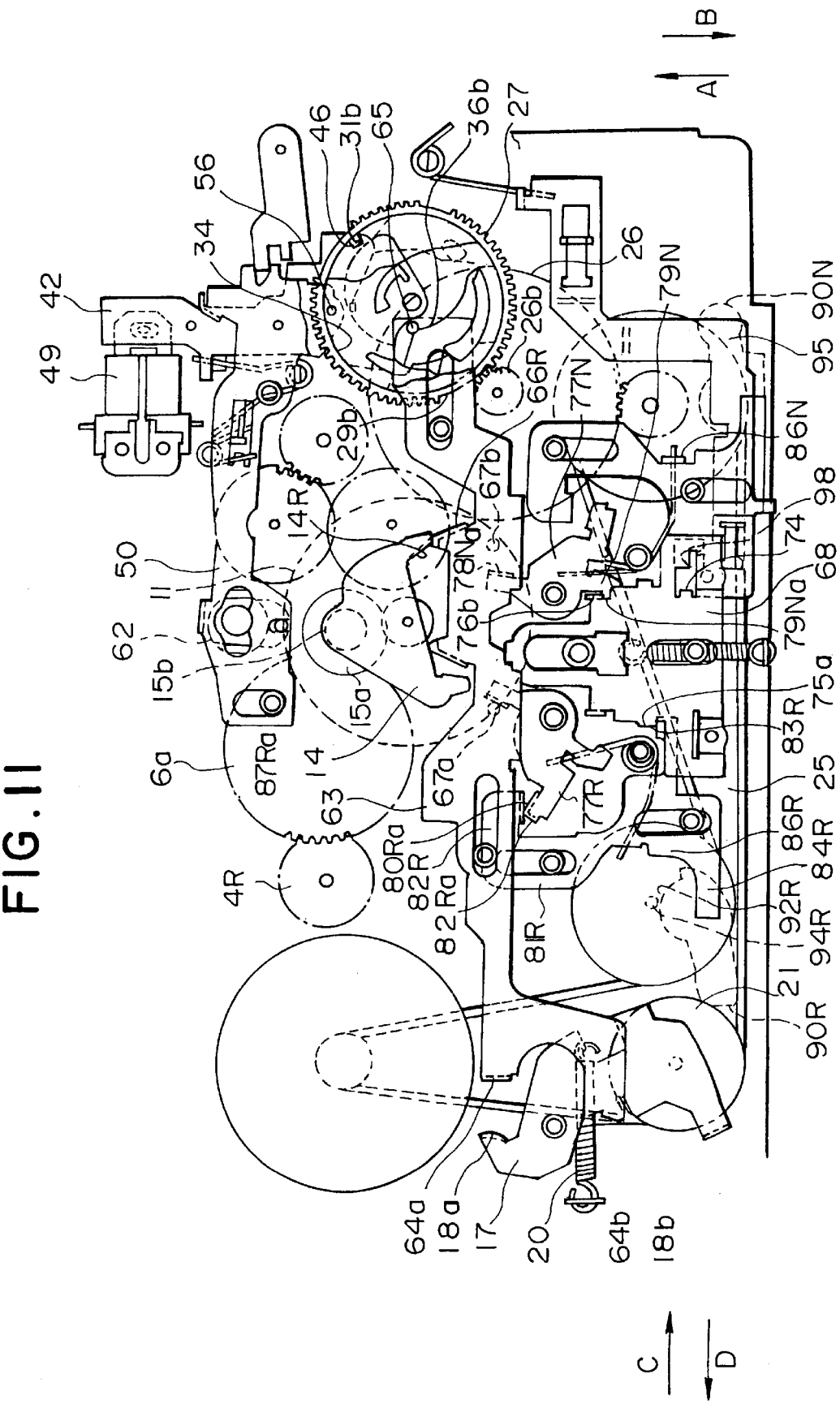
FIG. 11 is a plan view showing a reverse playback mode.

As shown in FIGS. 3 and 11, a control boss 65 is vertically projected downward at the other end of the NR slider 63 and is positioned to face the upper surface of the cam gear 27 inside the peripheral wall 34. As shown in FIG. 9, a projection 66 being trapezoidal in shape and projecting rearward is formed at a rear edge of the NR slider 63 substantially in its central portion, and pressing lugs 66F, 66R are erected to extend from left and right side edges of the projection 66 to the extremity of a rear edge thereof. The pressing lug 66F is opposed to the lefthand pressed lug 14F of the NR switching lever 14, and the pressing lug 66R is opposed to the righthand pressed lug 14R thereof. Two pressing pins 67a, 67b are vertically provided downward from the underside of the NR slider 63 substantially in its central portion at positions spaced from each other in the left and right direction.

As shown in FIGS. 3, 5 and 9, a head base 68 is supported to a central front end portion of the underside of the mechanism chassis 2 to be slidable back and forth, i.e., in the directions of arrows A and B in FIG. 5. Head support portions 69, 69 projecting upward from left and right ends of the head base 68 are protruded to the upper surface side of the mechanism chassis 2 through insertion holes 70, 70 formed in the mechanism chassis 2, as shown in FIG. 4. A magnetic head 71 is supported by the head support portions 69, 69 on the upper surface side of the mechanism chassis 2. As shown in FIG. 5, a tension coil spring 73 is stretched between a spring catch lug 68a vertically projected downward substantially from the central portion of the head base 68 and a spring catch lug 72 vertically projected downward from the central portion of the mechanism chassis 2 at its front edge. The coil spring 73 always urges the head base 68 in the direction of arrow B in FIG. 9. The head base 68 is movable between a stop position, i.e., an initial position, shown in FIG. 9 and a position shown in FIGS. 11 and 13 where the magnetic head 71 contacts the magnetic tape in the tape cassette to play back information signals. As shown in FIG. 15, in the AMS (Auto Music Scan) mode, i.e., during the operation of selecting a piece of music, the head base 68 is positioned such that the magnetic head 71 is slightly retracted from the magnetic tape to locate between the playback position and the stop position.

As shown in FIG. 9, an AMS position restricting lug 74 is vertically projected downward from the head base 68. As shown in FIG. 3, the head base 68 also has pressed lugs 75a, 75b vertically projected downward from left and right side edges of substantially the central portion thereof, and engagement lugs 76a, 76b vertically projected downward from left and right side edges of a portion nearer to a rear end of the head base.

Figure 10:
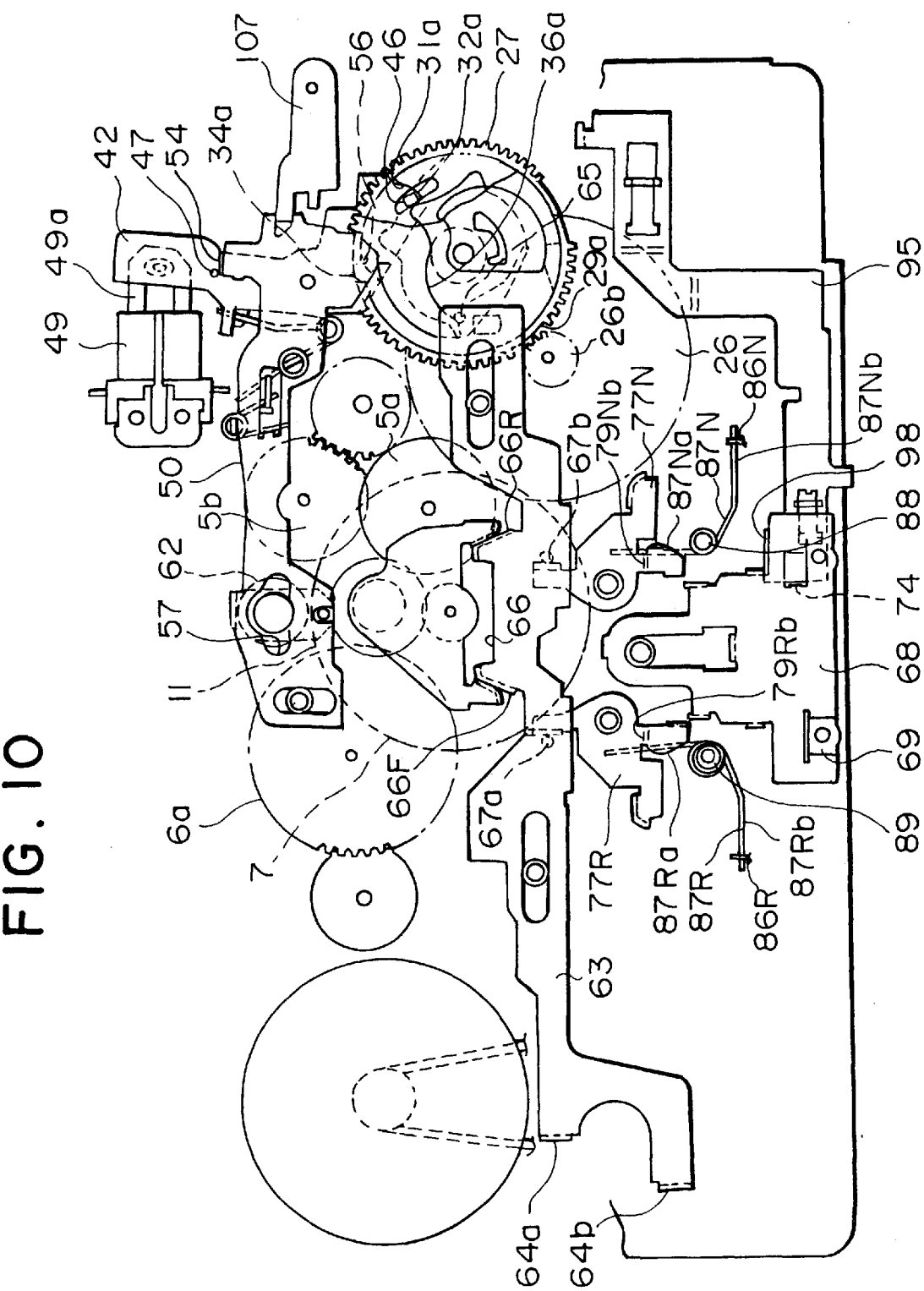
FIG. 10 is a plan view showing a state immediately after a plunger is excited from the stop mode.

As shown in FIGS. 3, 5 and 9, relay levers 77N, 77R are rotatably supported to the underside of the mechanism chassis 2 in positions on both sides of the rear end of the head base 68. The relay levers 77N, 77R have pressed arms 78N, 78R projecting in the direction of arrow A in FIG. 5 from their pivotal points 77Na, 77Ra, and pressed lugs 78Na, 78Ra erected respectively from right and left side edges of rear end portions of the pressed arms 78N, 78R. Engagement arms 79N, 79R are projected forward respectively from a position slightly deviated to the right from the pivot point 77Na of the relay lever 77N and a position slightly deviated to the left from the pivot point 77Ra of the relay lever 77R. As shown in FIGS. 11 and 14, an engagement lug 79Na is projected to the left from a front end of the engagement arm 79N and an engagement lug 79Ra is projected rightward from a front end of the engagement arm 79R. As shown FIG. 14, the relay lever 77N also has a pressing arm 80N projecting rightward and the relay lever 77R also has a pressing arm 80R projecting to the left. Pressing lugs 80Na, 80Ra are vertically projected downward from the pressing arms 80N, 80R in corners of their distal ends to cover rear edges and extremity edges thereof. The engagement arms 79N, 79R have base ends bent into the crank form, as viewed from side, such that arm portions locating nearer to the extremity than the base ends are located at a lower level than the other portions of the relay levers 77N, 77R. As shown in FIG. 10, portions 79Nb, 79Rb extending vertically at the base ends of the engagement arms 79N, 79R serve as spring catch portions.

As shown in FIG. 5, head moving sliders 81N, 81R are supported to the underside of the mechanism chassis 2 to be movable in the directions of arrows A and B on both sides of the head base 68 in positions slightly deviated to the right and left from the relay levers 77N, 77R, respectively.

Figure 12:
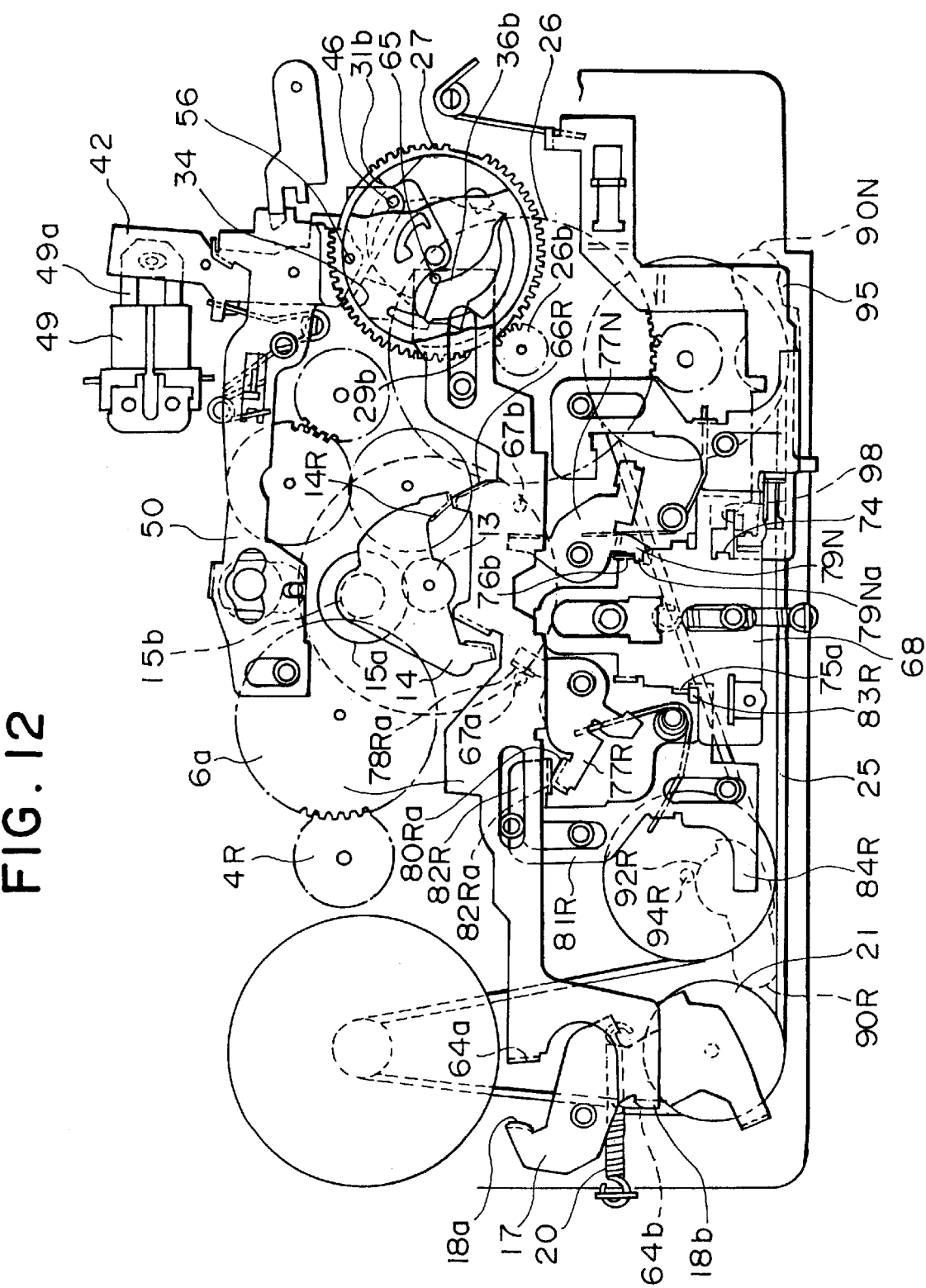
FIG. 12 is a plan view showing a state immediately after the plunger is excited from the reverse playback mode.
Figure 13:
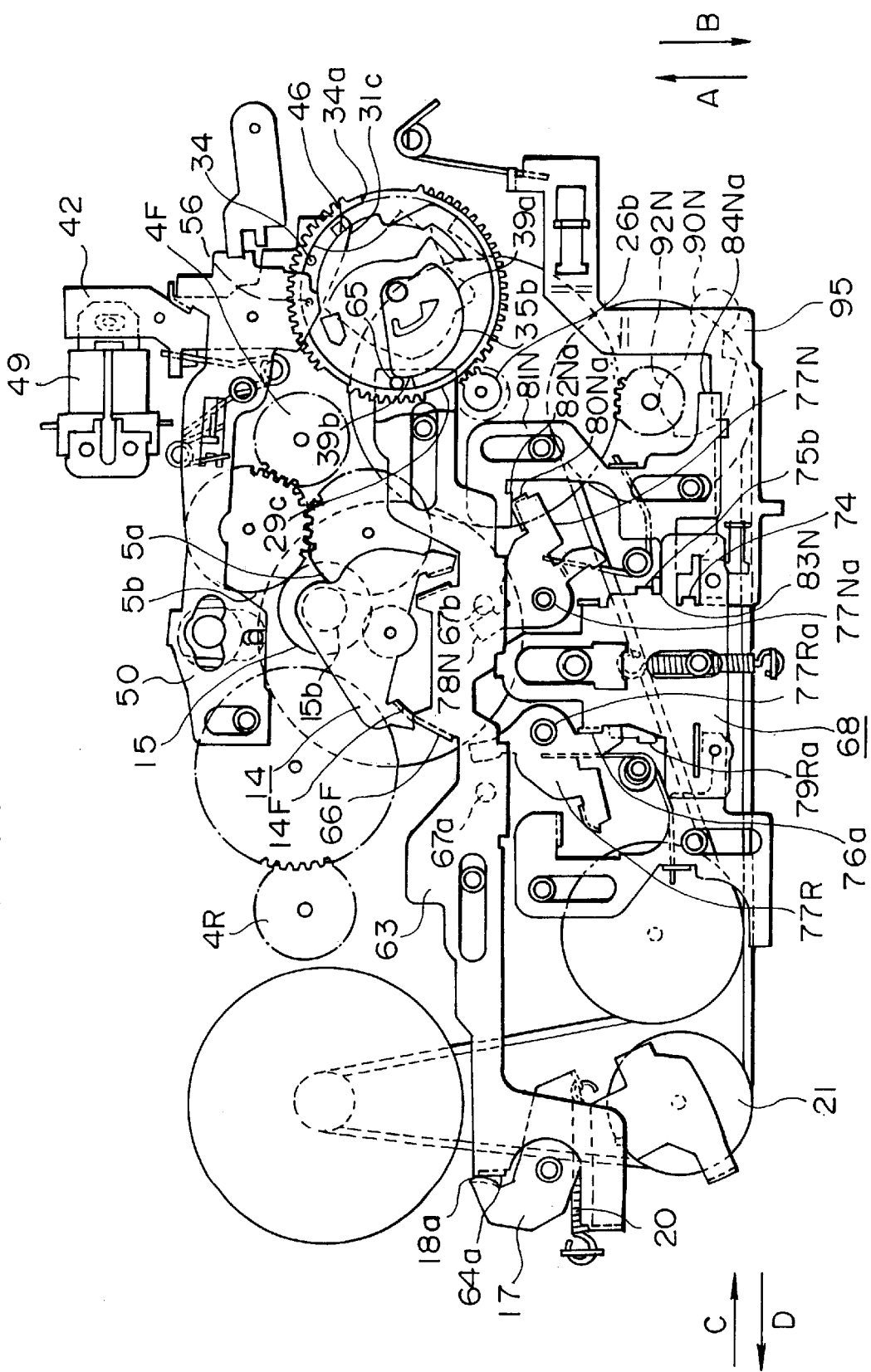
FIG. 13 is a plan view showing a forward (normal) playback mode.
Figure 17:
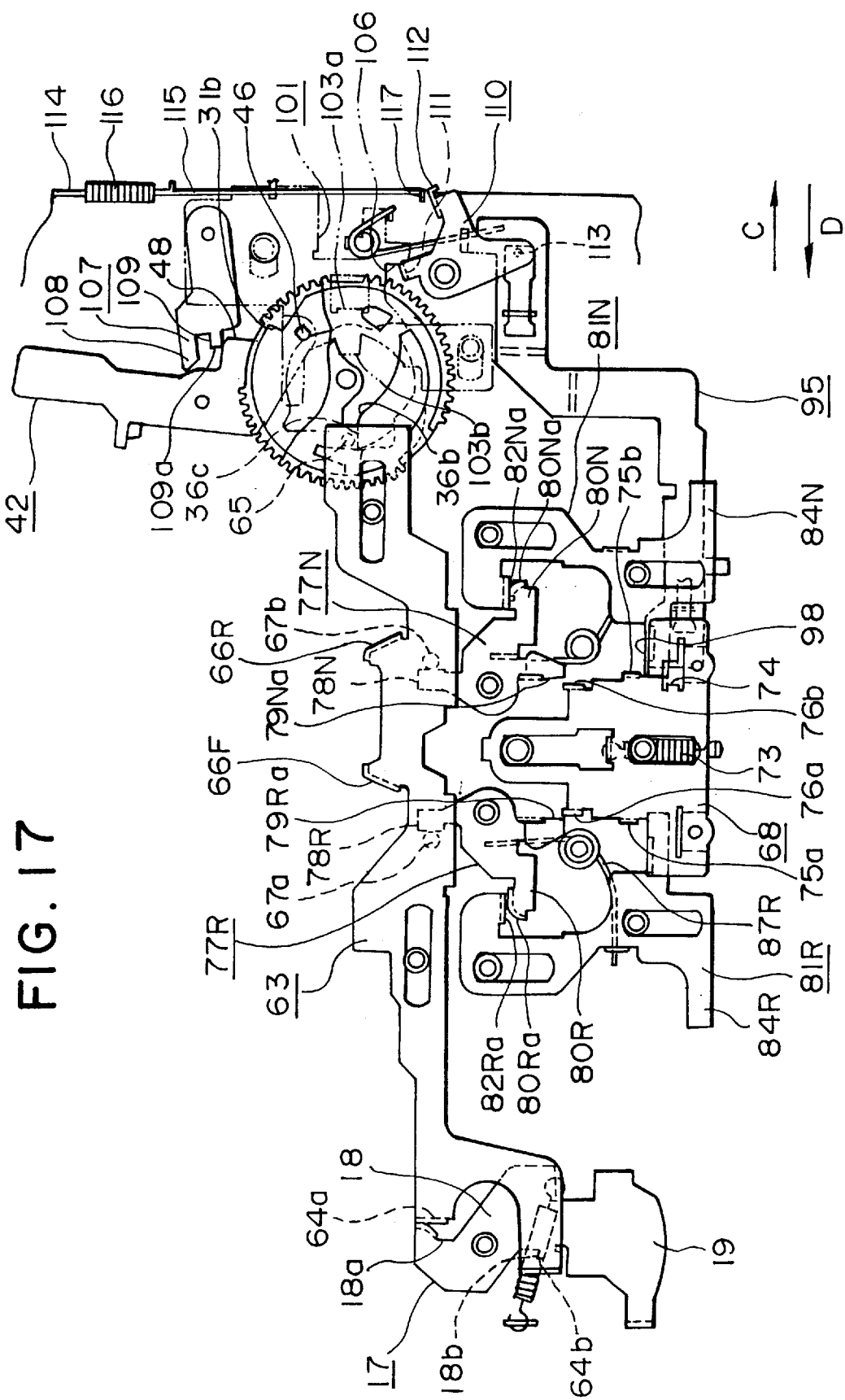
FIG. 17 is a plan view showing a state where the eject lever is ejected from the reverse playback mode.

A pressed arm 82N is projected to the left from the head moving slider 81N, as shown in FIG. 14, and a pressed arm 82R is projected to the right from the head moving slider 81R, as shown in FIG. 12. Pressed lugs 82Na, 82Ra are, as shown in FIG. 17, vertically projected downward from front edges of the pressed arms 82N, 82R. As shown in FIGS. 11 and 13, a pressing arm 83N is projected to the left from a portion of the head moving slider 81N nearer to a front end thereof, and a pressing arm 83R is projected to the right from a portion of the head moving slider 81R nearer to a front end thereof. As shown in FIGS. 12 and 17, a pinch roller pressing arm 84N is projected from the front end of the head moving slider 81N and a pinch roller pressing arm 84R is projected from the front end of the head moving slider 81R. Pinch roller pressing lugs 84Na (see FIG. 13), 84Ra are projected at distal ends of the pinch roller pressing arms 84N, 84R. As shown in FIG. 4, the pinch roller pressing lugs 84Na, 84Ra are protruded to the upper surface side of the mechanism chassis 2 through cutout holes 85, 85 formed in the mechanism chassis 2. Spring catch lugs 86N, 86R are, as shown in FIG. 10, vertically projected downward substantially from central portions of the head moving sliders 81N, 81R.

As shown in FIGS. 9 and 10, a coil portion of a torsional coil spring 87N is supported by a spring catch lug 88 formed by cutting and raising part of the mechanism chassis 2. The torsional coil spring 87N has one arm 87Na resiliently contacting the spring catch portion 79Nb of the relay lever 77N from the right, and the other arm 87Nb resiliently contacting the spring catch lug 86N of the head moving slider 81N. The torsional coil spring 87N applies pivoting force to always urge the relay lever 77N in the clockwise direction looking from above, whereby the head moving slider 81N is urged in the direction of arrow B in FIG. 9.

A coil portion of a torsional coil spring 87R is supported by a spring catch pin 89 vertically provided downward from the mechanism chassis 2. The torsional coil spring 87R has one arm 87Ra resiliently contacting the spring catch portion 79Rb of the relay lever 77R from the left, and the other arm 87Rb resiliently contacting the spring catch lug 86R of the head moving slider 81R. The torsional coil spring 87R applies pivoting force to always urge the relay lever 77R in the counterclockwise direction looking from above, whereby the head moving slider 81R is urged in the direction of arrow B in FIG. 9.

As shown in FIG. 4, pinch roller arms 90N, 90R are pivotally provided on the upper surface of the mechanism chassis 2 in positions spaced from each other in the left and right direction on both sides of the magnetic head 71. One end of the pinch roller arm 90N is pivotally supported by a shaft 91N, and a pinch roller 92N is rotatably supported to the other end, i.e., a free end, of the pinch arm 90N. The pinch roller arm 90N is always given pivoting force in the counterclockwise direction looking from above by a torsional coil spring 93N whose coil portion is supported by the shaft 91N. One arm 93Na of the torsional coil spring 93N engages a cutout 84Nb which is formed in the pinch roller pressing lug 84Na of the head moving slider 81N to be open upward. One end of the pinch roller arm 90R is pivotally supported by a shaft 91R, and a pinch roller 92R is rotatably supported to the other end, i.e., a free end, of the pinch roller arm 90R. The pinch roller arm 90R is always given pivoting force in the clockwise direction looking from above by a torsional coil spring 93R whose coil portion is supported by the shaft 91R. One arm 93Ra of the torsional coil spring 93R engages a cutout 84Rb which is formed in the pinch roller pressing lug 84Ra of the head moving slider 81R to be open upward.

Capstans 94N, 94R are erected at the centers of the flywheels 22, 23 and protruded to the upper surface side of the mechanism chassis 2. The capstans 94N, 94R cooperate with the pinch rollers 92N, 92R to grip the magnetic tape therebetween for running it. The magnetic tape is run in the forward direction when the capstan 94N and the pinch roller 92N are brought into a pressure contact state, and in the reverse direction when the capstan 94R and the pinch roller 92R are brought into a pressure contact state.

As shown in FIGS. 5 and 9, an AMS slider 95 is supported to the underside of the mechanism chassis 2 to be movable in the left and right direction. The AMS slider 95 is substantially crank-shaped looking from above, i.e., as viewed from the observer of FIG. 9. As shown in FIG. 15, guide holes 96a, 96b each being long in the left and right direction are formed respectively in portions of the AMS slider 95 near one end and the other end thereof. The guide holes 96a, 96b slidably engage guide lugs 97a, 97b vertically projected downward from the mechanism chassis 2. The AMS slider 95 is thereby supported to the mechanism chassis 2 to be slidable in the directions of arrows C and D in FIG. 15 within a range defined by the guide hole 96a. The righthand guide hole 96b is formed to be longer than the lefthand guide hole 96a. In a state where the AMS slider 95 is moved to a leftmost end of the movable range, i.e., in a state where a right edge of the guide hole 96a abuts with the guide lug 97a, therefore, an allowance is left in the righthand guide hole 96b rightward of the guide lug 97b so that an allowance area 96b' rightward of the guide lug 97b serves as a joint portion.

A rear edge of the AMS slider 95 at its left end is slightly projected rearward to provide a projecting rear edge 98 which serves as a position restricting edge. A spring catch lug 99 is vertically projected downward from a right end of the AMS slider 95. One arm 100a of a torsional coil spring 100 resiliently contacts the spring catch lug 99 from the right, thereby applying moving force to always urge the AMS slider 95 to the left.

Processes of establishing various modes by the above mode establishing system will be described below. The state shown in FIG. 9 represents the stop mode.

In the stop mode, the solenoid 49 is in a non-excited state and the acting piece 49a of the solenoid 49 is retracted. Accordingly, the acting boss 46 of the trigger lever 42 engages the stop surface 31a of the cam gear 27 to keep rotation of the cam gear 27 stopped. The no-tooth area 29a of the cam gear 27 is positioned to face the small gear 26b of the driving gear 26. Thus, even if the motor 16 is driven, the cam gear 27 will not rotate. With the trigger lever 42 not pivoting, the FR lever 50 is in such a state that the FR gear 62 meshes the gear portion 11 of the main gear 8 of the clutch 7 under the pivoting force applied from the torsional coil spring 53.

As explained above, therefore, when the motor 16 is driven and the main gear 8 is rotated counterclockwise, the FR gear 62 is brought into mesh with the relay gear 6a, causing the reel mount 4R to rotate at a high speed in the rewind direction. When the main gear 8 is rotated clockwise, the FR gear 62 is brought into mesh with the relay gear 5b, causing the reel mount 4F to rotate at a high speed in the fast forward direction.

The NR slider 63 is in the above-mentioned neutral state shown in FIG. 9. Accordingly, the pressed lugs 78N, 78R of the relay levers 77N, 77R are held in resilient contact with the pressing pins 67a, 67b of the NR slider 63 in the neutral state, the head sliders 81N, 81R are in the frontmost positions of their movable ranges, and the head base 68 is also in the frontmost position of its movable range. The AMS slider 95 is in such a state that its left edge resiliently contacts the AMS position restricting lug 74 of the head base 68.

The reverse playback mode will be described below.

From the above stop mode, the solenoid 49 is excited and the motor 16 is driven to rotate the driving gear 26 clockwise.

With the solenoid 49 excited, the acting piece 49a of the solenoid 49 is protruded, whereupon the trigger lever 42 pivots clockwise looking from above, i.e., as viewed from the observer of FIG. 10, and the acting boss 46 of the trigger lever 42 disengages from the stop surface 31a of the cam gear 27 to move toward the center of the cam gear 27. This allows the cam gear 27 to rotate now counterclockwise. Since the acting boss 46 presses the initial urging surface 32a of the cam gear 27 under the pivoting force applied to the trigger lever 42 from the torsional coil spring 44, the cam gear 27 is rotated counterclockwise to some extent and the gear portion 28 of the cam gear 27 meshes the small gear 26b of the driving gear 26, as shown in FIG. 10. Accordingly, the cam gear 27 continues to rotate counterclockwise until a next stop position where the next no-tooth area 29b is located to face the small gear 26b of the driving gear 26.

As shown in FIG. 10, when the trigger lever 42 pivots clockwise, the pressing boss 47 of the trigger lever 42 pushes the pressed portion 54 of the FR lever 50 substantially forward rightward, causing the FR lever 50 to pivot clockwise against the resilient force of the torsional coil spring 53. The FR gear 62 supported by the FR lever 50 is thereby released from mesh with the gear portion 11 of the main gear 8 of the clutch 7. Thus, the FR gear 62 takes no part in the rotation of the reel mounts 3F, 3R. With the continued counterclockwise rotation of the cam gear 27, as shown in FIG. 11, the controlled boss 56 of the FR lever 50 engages the inner surface of the peripheral wall 34 on the upper surface of the cam gear 27, whereby the FR lever 50 is held in the state having pivoted clockwise until the stop mode is reached again.

On the other hand, during a period in which the cam gear 27 continues the rotation to the next stop position stated above, the acting boss 46 of the trigger lever 42 is pressed by the return slope 33a of the cam gear 27 toward the peripheral edge thereof. Accordingly, the trigger lever 42 pivots counterclockwise and the acting piece 49a coupled to the trigger lever 42 is retracted into the solenoid 49. Then, as shown in FIG. 11, when the cam gear 27 is rotated to the position where the next no-tooth area 29b faces the small gear 26b of the driving gear 26, the acting boss 46 of the trigger lever 42 engages the next stop surface 31b of the cam gear 27. The cam gear 27 is thereby held in the stop position.

During the period in which the cam gear 27 continues the rotation to the next stop position, as shown in FIG. 11, the NR slider 63 is moved in the direction of arrow C in FIG. 11. This is because as the cam gear 27 is rotated counterclockwise from the state of the stop mode, the controlled boss 65 of the NR slider 63 contacts the pulling surface 36a of the cam gear 27 and is then pulled by the pulling surface 36a in the direction of arrow C.

As shown in FIG. 11, when the counterclockwise end of the no-tooth area 29b comes to a position facing the small gear 26b of the driving gear 26, the controlled boss 65 is brought into a state of resiliently contacting the first acting surface 36b of the cam gear 27. Specifically, when the NR slider 63 is moved in the direction of arrow C, the abutting lug 64b of the NR slider 63 pulls the abutting lug 18b of the tension lever 17 in the direction of arrow C. The tension lever 17 pivots counterclockwise and the tension coil spring 20 is extended so that its tensile force acts on the NR slider 63 to return in the direction of arrow D. The tensile force of the tension coil spring 20 acts on the first acting surface 36b through the controlled boss 65, whereupon the cam gear 27 is given rotating force to rotate it counterclockwise and the stop surface 31b of the cam gear 27 engages the acting boss 46 of the trigger lever 42.

Large torque is required when carrying out the fast forward or rewind operation stated above, but such a large torque is not required in the playback mode. Taking that into account, when the NR slider 63 is in the neutral state, the tension pulley 21 is held in a position where the driving belt 25 is given a tension enough to produce torque necessary for the fast forward or rewind operation, as shown in FIG. 9. In the playback mode, the tension lever 17 pivots counterclockwise to loosen the tension of the driving belt 25, as shown in FIGS. 11 and 13, thereby producing torque only required for the playback mode. As a result, power consumption is reduced. This equally applies to the forward playback mode described later.

As shown in FIGS. 10 and 11, when the NR slider 63 is moved in the direction of arrow C, the pressing lug 66R of the NR slider 63 pushes the pressed lug 14R of the NR switching lever 14 substantially rearward while shifting it in the direction of arrow C. The NR switching lever 14 pivots counterclockwise, whereupon the small gear 15b of the NR switching gear 15 supported by the NR switching lever 14 comes into mesh with the relay gear 6a, causing the reel mount 3R to rotate in the reverse direction.

With the movement of the NR slider 63 in the direction of arrow C, the pressing pin 67a of the NR slider 63 pushes the pressed lug 78Ra of the relay lever 77R in the direction of arrow C, causing the relay lever 77R to pivot clockwise. Since the other pressing pin 67b of the NR slider 63 moves away from the pressed lug 78Na of the other relay lever 77N, the relay lever 77N pivots clockwise by the torsional coil spring 87N into such a state that the engagement lug 79Na of the relay lever 77N resiliently contacts the engagement lug 76b of the head base 68 from the right.

When the relay lever 77R pivots clockwise, the pressing lug 80Ra of the relay lever 77R pushes the pressed lug 82Ra of the head moving slider 81R in the direction of arrow A in FIG. 11, causing the head moving slider 81R to move in the direction of arrow A. When the head moving slider 81R moves in the direction of arrow A, the pressing arm 83R of the head moving slider 81R pushes the pressed lug 75a of the head base 68 in the direction of arrow A, causing the head base 68 to advance in the direction of arrow A against the tensile force of the tension coil spring 73. When the head base 68 moves to the playback position where the magnetic head 71 surely contacts the magnetic tape, the engagement lug 76b of the head base 68 advances beyond the engagement lug 79Na of the relay lever 77N in the direction of arrow A. This allows the relay lever 77N to further pivot clockwise, whereupon the engagement lug 79Na of the relay lever 77N is positioned forward of the engagement lug 76b of the head base 68 in the direction of arrow B to engage the same. Accordingly, the head base 68 is prevented from moving back to the stop position in the direction of arrow B. Since the AMS position restricting lug 74 of the head base 68 is also moved rearward away from the left edge of the AMS slider 95 with the movement of the head base 68 in the direction of arrow B, the AMS slider 95 is moved in the direction of arrow D until the right end of the guided hole 96a of the AMS slider 95 abuts the guide lug 97a. As a result, the position restricting edge 98 of the AMS slider 95 is located slightly away forward of the AMS position restricting lug 74 of the head base 68 in the direction of arrow B.

With the movement of the head moving slider 81R in the direction of arrow A, the pinch roller pressing lug 84Ra of the head moving slider 81R pushes one arm 93Ra of the torsional coil spring 93R in the direction of arrow A in FIG. 4. Correspondingly, the pinch roller arm 90R pivots counterclockwise and the pinch roller 92R supported by the pinch roller arm 90R is brought into pressure contact with the capstan 94R through the magnetic tape (not shown). As a result, the reverse playback mode represented in FIG. 11 is established.

The forward playback mode will be described below. The forward playback mode is established by exciting the solenoid 49 and driving the motor 16 from the state shown in FIG. 11.

In a similar manner as explained above, when the solenoid 49 is excited, the trigger lever 42 pivots clockwise and the acting boss 46 of the trigger lever 42 disengages from the stop surface 31b of the cam gear 27 to move toward the center of the cam gear 27. The cam gear 27 is thereby released from the locked state, as shown in FIG. 12. Since the tensile force of the tension coil spring 20 simultaneously acts on the first acting surface 36b and then the second acting surface 36c of the cam gear 27 through the controlled boss 65 of the NR slider 63, the cam gear 27 is rotated counterclockwise and the gear portion 28 of the cam gear 27 meshes the small gear 26b of the driving gear 26. Accordingly, the cam gear 27 continues to rotate counterclockwise until a next stop position where the next no-tooth area 29c is located to face the small gear 26b of the driving gear 26.

During a period in which the cam gear 27 continues the rotation to the next stop position stated above, the acting boss 46 of the trigger lever 42 is pressed by the return slope 33b of the cam gear 27 toward the peripheral edge thereof. Accordingly, the trigger lever 42 pivots counterclockwise and the acting piece 49a coupled to the trigger lever 42 is retracted into the plunger 49. Then, as shown in FIG. 13, when the cam gear 27 is rotated to the position where the next no-tooth area 29c faces the small gear 26b of the driving gear 26, the acting boss 46 of the trigger lever 42 engages the next stop surface 31c of the cam gear 27. The cam gear 27 is thereby held in the stop position.

During the period in which the cam gear 27 continues the rotation to the next stop position, as shown in FIG. 13, the NR slider 63 is moved in the direction of arrow D to return to the neutral position, followed by further moving in the direction of arrow D. This is because as the cam gear 27 is rotated counterclockwise from the state of the reverse playback mode, the controlled boss 65 of the NR slider 63 contacts the pushing surface 39a of the cam gear 27 and is then pushed by the pushing surface 39a in the direction of arrow D.

As shown in FIG. 13, when the counterclockwise end of the no-tooth area 29c comes to a position facing the small gear 26b of the driving gear 26, the controlled boss 65 is brought into a state resiliently contacting the acting surface 39b of the cam gear 27. Specifically, when the NR slider 63 is moved in the direction of arrow D, the abutting lug 64a of the NR slider 63 pushes the abutting lug 18a of the tension lever 17 in the direction of arrow D. The tension lever 17 pivots counterclockwise and the tension coil spring 20 is extended so that its tensile force acts on the NR slider 63 to return in the direction of arrow C. The tensile force of the tension coil spring 20 acts on the acting surface 39b through the controlled boss 65, whereupon the cam gear 27 is given rotating force to rotate it counterclockwise and the stop surface 31c of the cam gear 27 engages the acting boss 46 of the trigger lever 42.

When the NR slider 63 is moved in the direction of arrow D in FIG. 13, the pressing lug 66F of the NR slider 63 pushes the pressed lug 14F of the NR switching lever 14 substantially rearward while shifting it in the direction of arrow D. The NR switching lever 14 pivots clockwise, whereupon the small gear 15b of the NR switching gear 15 supported by the NR switching lever 14 comes into mesh with the relay gear 5a, causing the reel mount 3F to rotate in the forward direction.

With the movement of the NR slider 63 in the direction of arrow D, the pressing pin 67b of the NR slider 63 pushes the pressed lug 78Na of the relay lever 77N in the direction of arrow D, causing the relay lever 77N to pivot counterclockwise. Since the other pressing pin 67a of the NR slider 63 moves away from the pressed lug 78Ra of the other relay lever 77R, the relay lever 77R pivots counterclockwise by the torsional coil spring 87R into such a state that the engagement lug 79Ra of the relay lever 77R resiliently contacts the engagement lug 76a of the head base 68 from the left.

When the relay lever 77N pivots counterclockwise, the pressing lug 80Na of the relay lever 77N pushes the pressed lug 82Na of the head moving slider 81N in the direction of arrow A in FIG. 13, causing the head moving slider 81N to move in the direction of arrow A. When the head moving slider 81N moves in the direction of arrow A, the pressing arm 83N of the head moving slider 81N pushes the pressed lug 75b of the head base 68 in the direction of arrow A, causing the head base 68 to advance in the direction of arrow A against the tensile force of the tension coil spring.73. When the head base 68 moves to the playback position where the magnetic head 71 surely contacts the magnetic tape, the engagement lug 76a of the head base 68 advances beyond the engagement lug 79Ra of the relay lever 77R in the direction of arrow A. The relay lever 77R is thus allowed to further pivot counterclockwise, whereupon the engagement lug 79Ra of the relay lever 77R is positioned forward of the engagement lug 76a of the head base 68 in the direction of arrow B to engage the same. Accordingly, the head base 68 is prevented from moving back to the stop position, i.e., the initial position, in the direction of arrow B. The AMS slider 95 is held in a state where it is moved to the leftmost end of the movable range thereof. As a result, the position restricting edge 98 of the AMS slider 95 is located slightly away forward of the AMS position restricting lug 74 of the head base 68 in the direction of arrow B.

With the movement of the head moving slider 81N in the direction of arrow A in FIG. 13, the pinch roller pressing lug 84Na of the head moving slider 81N pushes one arm 93Na of the torsional coil spring 93N in the direction of arrow A in FIG. 4. Correspondingly, the pinch roller arm 90N pivots clockwise and the pinch roller 92N supported by the pinch roller arm 90N is brought into pressure contact with the capstan 94N through the magnetic tape (not shown). Because the head moving slider 81R on the left side is returned in the direction of arrow B in FIG. 13 upon the relay lever 77R pivoting clockwise, the pinch roller 90R also pivots clockwise and the pinch roller 92R supported by the pinch roller arm 90R is moved away from the capstan 94R. As a result, the forward playback mode represented in FIG. 13 is established.

The AMS mode will be described below. The AMS mode is a mode for selecting a plurality of information signals, e.g., music signals, recorded on a magnetic tape. In the AMS mode, the magnetic head 71 is moved back in the direction of arrow B from the position for playing back the magnetic tape, but maintained in light contact with the magnetic tape.

The AMS mode is established by exciting the solenoid 49 and driving the motor 16 from the state of the forward playback mode.

In a similar manner as explained above, when the solenoid 49 is excited, the trigger lever 42 pivots clockwise and the acting boss 46 of the trigger lever 42 disengages from the stop surface 31c of the cam gear 27 to move toward the center of the cam gear 27, as shown in FIG. 14. This allows the cam gear 27 to rotate counterclockwise under the tensile force of the tension coil spring 20 applied to the acting surface 39b of the cam gear 27 through the controlled boss 65 of the NR slider 63, bringing the gear portion 28 of the cam gear 27 into mesh with the small gear 26b of the driving gear 26. Accordingly, the cam gear 27 continues to rotate counterclockwise until the stop surface 31a abuts the acting boss 46 of the trigger lever 42. During the continued rotation of the cam gear 27, the acting boss 46 of the trigger lever 42 is pressed by the return slope 33c of the cam gear 27 toward the peripheral edge thereof and the trigger lever 42 is returned to the original state.

When the cam gear 27 starts the counterclockwise rotation upon the gear portion 28 meshing the small gear 26b of the driving gear 26, the controlled boss 65 of the NR slider 63 is neither pushed nor pulled, and therefore the NR slider 63 is moved in the direction of arrow C in FIG. 14 under the resilient force of the tension coil spring 20 applied thereto through the abutting lug 64a. When the NR slider 63 returns to the neutral position, the resilient forces of the tension coil spring 20 acting on the abutting lugs 64a, 64b through the abutting lugs 18a, 18b of the tension lever 17 are balanced and the NR slider 63 is held in the neutral position as shown in FIG. 15.

With the NR slider 63 returning to the neutral position, the relay levers 77N, 77R are also returned to the neutral positions and the head moving sliders 81N, 81R are returned to the frontmost ends of their movable ranges in the direction of arrow B. Correspondingly, the pinch roller arm 90N pivots counterclockwise and the pinch roller 92N supported by the pinch roller arm 90N is moved away from the capstan 94N. At the same time, the engagement lug 76a of the head base 68 disengages from the engagement lug 79Ra of the relay lever 77R and the head base 68 is urged to move in the direction of arrow B in FIG. 15 under the tensile force of the tension coil spring 73. But, because the position restricting edge 98 of the AMS slider 95 is located slightly forward of the AMS position restricting lug 74 of the head base 68, the AMS position restricting lug 74 comes into engagement with the position restricting edge 98 when the head base 68 is slightly moved in the direction of arrow B. The movement of the head base 68 in the direction of arrow B is thereby stopped, resulting in the state of the AMS mode shown in FIG. 15. In this state, the magnetic head 71 is in an AMS position where it is maintained in light contact with the magnetic tape (not shown).

Since the controlled boss 56 of the FR lever 50 comes to a position confronting the cutout 34a of the peripheral wall 34 of the cam gear 27, the FR lever 50 pivots counterclockwise under the pivoting force applied from the torsional coil spring 53, and the FR gear 62 supported by the FR lever 50 is brought into mesh with the gear portion 11 of the main gear 8 of the clutch 7. Accordingly, when the main gear 8 is rotated counterclockwise, the FR gear 62 meshes with the relay gear 6a, causing the reel mount 3R to rotate at a high speed in the reverse direction. When the main gear 8 is rotated clockwise, the FR gear 62 meshes with the relay gear 5b, causing the reel mount 3F to rotate at a high speed in the forward direction.

A mechanism for establishing an eject mode where the positions of all the above-mentioned components are returned to the initial positions and the tape cassette can be removed from the apparatus will be described below.

Figure 16:
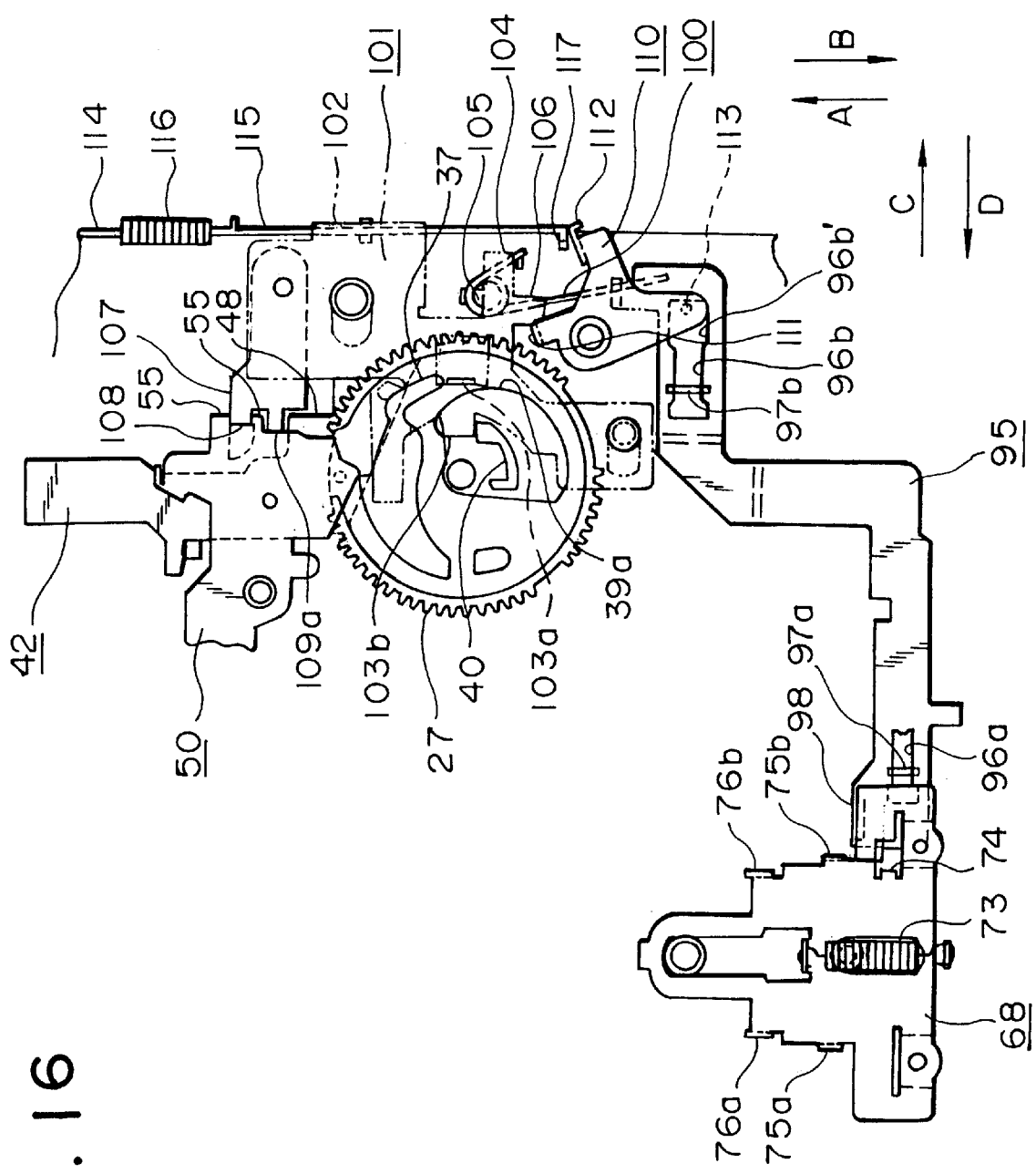
FIG. 16 is a plan view, partly omitted, of primary elements to show eject operation together with FIGS. 17 and 18, the view illustrating a state where an eject lever is ejected from the stop mode.

As shown in FIGS. 3 and 16, an eject lever 101 is supported to the underside of the mechanism chassis 2 in its central portion to be movable in the directions of arrows C and D in FIG. 16. The eject lever 101 has an operating portion 102 projecting from one side edge of the mechanism chassis 2, a stopper lug 103a, a spring catch lug 104 and a spring support lug 105 each vertically projecting downward (upward in FIG. 3 or in the direction toward the back of the drawing sheet of FIG. 16), and a stopper edge 103b positioned leftward (rightward in FIG. 3) of the stopper lug 103a. The eject lever 101 also includes a pressing lug 106 formed near the spring catch lug 104. The stopper lug 103a is positioned between the peripheral wall 34 and the projections 35a, 35b, 35c on the upper surface side of the cam gear 27. A coil portion 100c of a torsional coil spring 100 is externally fitted over and supported by the spring support lug 105. One arm 100b of the torsional coil spring 100 resiliently contacts the spring catch lug 104 of the eject lever 101 from the left so that the eject lever 101 is always given force urging it to move to the right.

An operating force adjust lever 107 is pivotally supported at its base (right) end portion to the eject lever 101. From a free (left) end of the operating force adjust lever 107, as shown in FIG. 17, a joint lug 108 and a pressing arm 109 are projected with a certain spacing therebetween. A pressing lug 109a is vertically projected downward from a distal end of the pressing arm 109.

The joint lug 108 is held between the pair of holding lugs 55, 55 of the FR lever 50 so that the operating force adjust lever 107 also pivots upon pivoting of the FR lever 50. When the FR gear 62 supported by the FR lever 50 is in a state meshing the gear portion 11 of the main gear 8 of the clutch 7, the pressing lug 109a of the operating force adjust lever 107 is in a position spaced from the pressed portion 48 of the trigger lever 42 under the condition where the acting lug 49a of the solenoid 49 is retracted. When the FR lever 50 pivots clockwise from the above state, the operating force adjust lever 107 pivots counterclockwise and the pressing lug 109a thereof is positioned close to the pressed portion 48 of the trigger lever 42 under the condition where the acting lug 49a of the plunger 49 is retracted.

An eject relay lever 110 is pivotally supported to the underside of the mechanism chassis 2 in a position between the right end portion of the AMS slider 95 and the eject lever 101. A pressed lug 111 is vertically projected downward from a rear end of the eject relay lever 110 and is held in abutment with the pressing lug 106 of the eject lever 101. A pressing lug 112 is formed at a right end of the eject relay lever 110. A joint pin 113 is vertically projected downward from a front end of the eject relay lever 110 and is positioned within the joint portion 96b' of the AMS slider 95.

A lock member 115 is supported to a right side wall 114 of the mechanism chassis 2 to be movable in the directions of arrows A and B in FIG. 16. A compression coil spring 116 disposed under compression between the lock member 115 and the right side wall 114 of the mechanism chassis 2 applies force urging the lock member 115 to move in the direction of arrow B in FIG. 16. A pressed lug 117 is projected at a front end of the lock member 115 and resiliently contacts the pressing lug 112 of the eject relay lever 110 in the direction of arrow B in FIG. 16.

As shown in FIG. 2B, an engagement cutout 118 being open forward is formed in an upper (lower left on the drawing sheet of FIG. 2B) end portion of the lock member 115. A sloped edge 119 slowing downward toward its front end is formed in a front end portion of an upper edge of the lock member 115.

As shown in FIG. 1, the mechanism chassis 2 explained above is disposed in the housing 120 of the tape player 1. The lid 121 is, as shown in FIG. 2A, pivotally supported at its lower (left in FIG. 4) end to a lower end of the housing 120. An engagement member 122 is projected from an inner surface of the lid 121 at its upper (right in FIG. 4) end. When the lid 121 is closed, the engagement member 122 presses the sloped edge 119 of the lock member 115, causing the lock member 115 to move in the direction of arrow A in FIG. 16. When the engagement member 122 comes to a position corresponding to an opening of the engagement cutout 118 of the lock member 115, the lock member 115 is moved back in the direction of arrow B in FIG. 16 by extension force of the compression coil spring 116, causing the engagement member 122 of the lid 121 to engage in the engagement cutout 118. As a result, the lid 121 is locked in a shut position where the opening of the housing 120 is closed.

The eject operation will be described below. The eject operation from the stop mode or the AMS mode will be first described.

When the eject lever 101 is pushed to the left in the state of the stop mode shown in FIG. 9, the pressing lug 106 of the eject lever 101 pushes the pressed lug 111 of the eject relay lever 110 in the direction of arrow D in FIG. 16, whereupon the eject relay lever 110 pivots counterclockwise looking from above (from the observer of the drawing sheet of FIG. 16) and the pressing lug 112 of the eject relay lever 110 is moved substantially in the direction of arrow A in FIG. 16. Accordingly, the pressed lug 117 of the lock member 115 is pushed in the direction of arrow A in FIG. 16 by the pressing lug 112 and the lock member 115 is moved in the direction of arrow A in FIG. 16 against the urging force applied from the compression coil spring 116, causing the engagement cutout 118 of the lock member 115 to disengage from the engagement member 122 of the lid 121 in the direction of arrow A. The lid 121 is thus released from the locked position providing the closed state. Upon the release from the locked position, the lid 121 pivots to be open by the urging mechanism (not shown), as shown in FIG. 2A.

When the force pushing the eject lever 101 in the direction of arrow D in FIG. 16 is eliminated, the eject lever 101 is returned to its original position by the torsional coil spring 100. Correspondingly, the eject relay lever 110 and the lock member 115 are also returned to their original positions.

The eject operation from the AMS mode is basically the same as the eject operation from the stop mode except for the following point. When the eject relay lever 110 pivots counterclockwise, the joint pin 113 of the eject relay lever 110 pushes a right opening edge of the joint portion 96b' of the AMS slider 95 in the direction of arrow C in FIG. 16. The AMS slider 95 is thus moved in the direction of arrow C, causing the position restricting edge 98 of the AMS slider 95 to move away from the front side of the AMS position restricting lug 74 of the head base 68 in the direction of arrow C. As a result, the head base 68 is returned under the tensile force of the tension coil spring 73 to the stop position corresponding to the frontmost end of its movable range.

The eject operation from the reverse playback mode will be described below.

When the eject lever 101 is pushed in the direction of arrow D in FIG. 17 in the state of the reverse playback mode shown in FIG. 11, the operating force adjust lever 107 is also moved in the direction of arrow D and the pressing lug 109a of the operating force adjust lever 107. pushes the pressed portion 48 of the trigger lever 42 in the direction of arrow D. As shown in FIG. 17, therefore, the trigger lever 42 pivots clockwise, the acting boss 46 of the trigger lever 42 disengages from the stop surface 31b of the cam gear 27 toward the center, and the cam gear 27 is released from the locked state. Upon the cam gear 27 being unlocked, the tensile force of the tension coil spring 20 causes the controlled boss 65 of the NR slider 63 to contact and push the first and second acting surfaces 36b, 36c of the cam gear 27 successively while rotating the cam gear 27 counterclockwise, and the NR slider 63 is returned to the neutral position.

At this time, to keep the cam gear 27 from rotating counterclockwise so excessively that the gear portion 28 of the cam gear 27 comes into mesh with the small gear 26b of the driving gear 26, the stopper lug 103a of the eject lever 101 pushed in the direction of arrow D abuts a counterclockwise end of the projection 35c of the cam gear 27, as shown in FIG. 17, thereby preventing the excessive rotation of the cam gear 27 in the counterclockwise direction.

Upon the NR slider 63 returning to the neutral position, the relay levers 77N, 77R and the head moving sliders 81N, 81R are also returned to the neutral positions, whereby the head base 68 is unlocked from the playback position.

At the same time, since the eject relay lever 110 pivots counterclockwise, the joint pin 113 of the eject relay lever 110 is moved substantially to the right (in the direction of arrow C in FIG. 17) and pushes the right opening edge of the joint portion 96b' of the AMS slider 95 in the direction of arrow C. Correspondingly, the AMS slider 95 is moved in the direction of arrow C, causing the position restricting edge 98 of the AMS slider 95 to move away from the front side of the AMS position restricting lug 74 of the head base 68 in the direction of arrow C. As a result, the head base 68 is returned under the tensile force of the tension coil spring 73 to the stop position corresponding to the frontmost end of its movable range. As stated above, the lock member 115 is simultaneously moved rearward to release the lid 121 from the locked state.

Comparing the eject operation from the stop mode, the eject operation from the reverse playback mode includes the additional operation of making the trigger lever 42 pivot clockwise. Pushing the eject lever 101 in the direction of arrow D therefore requires larger force in the eject operation from the reverse playback mode than in the eject operation from the stop mode. In other words, the user feels heavier in resistance pushing the operating portion 102. A heavier feeling in performing the eject operation from the playback state contributes to preventing false operation.

The eject operation from the forward playback mode will be described below.

Figure 18:
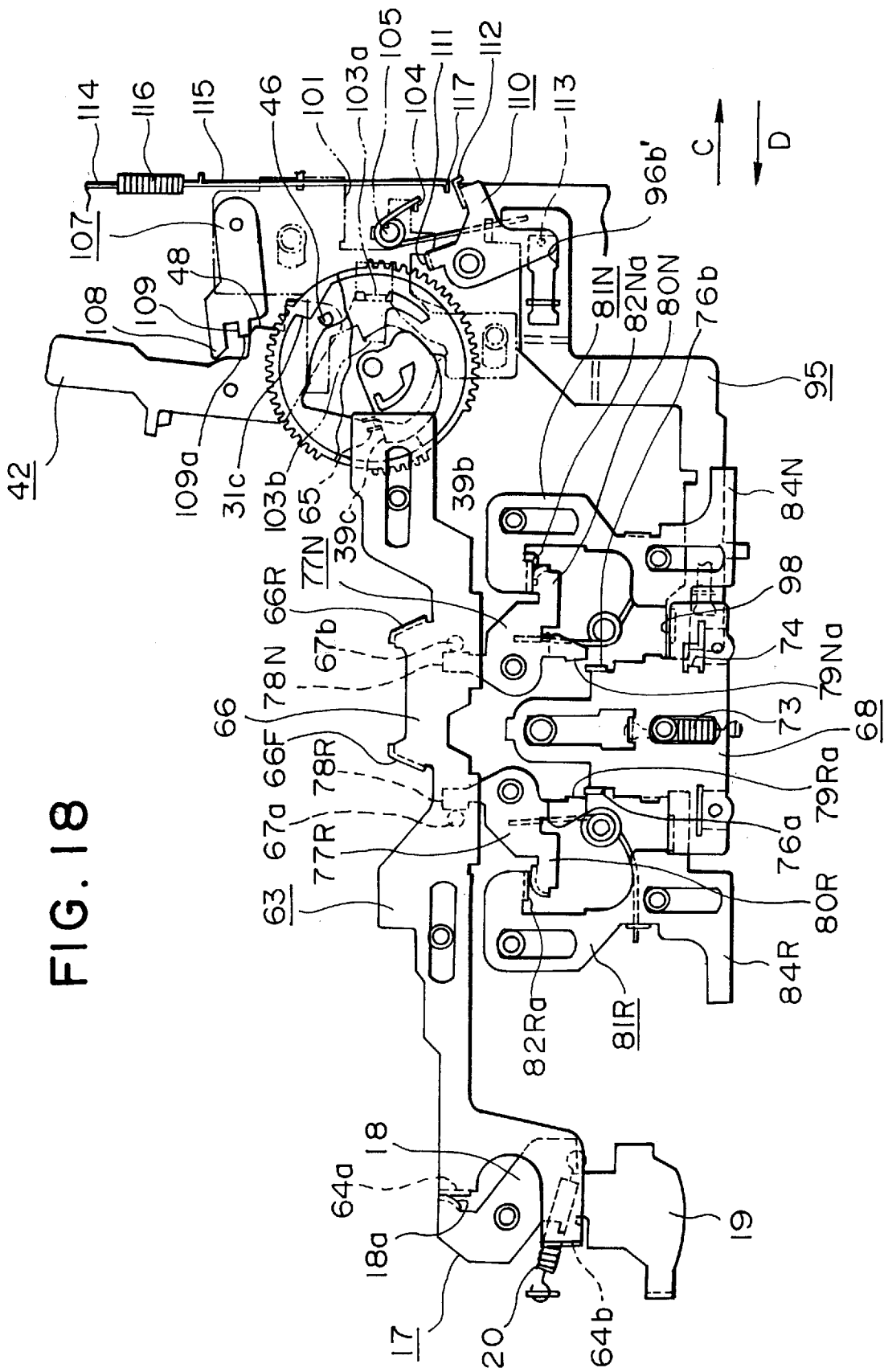
FIG. 18 is a plan view showing a state where the eject lever is ejected from the forward playback mode.

As with the above eject operation from the reverse playback mode, when the eject lever 101 is pushed in the direction of arrow D in FIG. 18 in the state of the reverse playback mode shown in FIG. 13, the trigger lever 42 pivots clockwise, the acting boss 46 of the trigger lever 42 disengages from the stop surface 31c of the cam gear 27 toward the center, and the cam gear 27 is released from the locked state. Upon the cam gear 27 being unlocked, as shown in FIG. 18, the tensile force of the tension coil spring 20 causes the controlled boss 65 of the NR slider 63 to contact and push the acting surface 39b of the projection 35b of the cam gear 27 and then a portion of a side surface 39c thereof which locates near its outer peripheral end while rotating the cam gear 27 counterclockwise, and the NR slider 63 is returned to the neutral position.

Also in this case, to keep the cam gear 27 from rotating counterclockwise so excessively that the gear portion 28 of the cam gear 27 comes into mesh with the small gear 26b of the driving gear 26, the stopper lug 103a of the eject lever 101 pushed in the direction of arrow D abuts a clockwise end of the permissive portion 38 formed as part of the outer peripheral surface of the projection 35a of the cam gear 27, as shown in FIG. 18, thereby preventing the excessive rotation of the cam gear 27 in the counterclockwise direction.

Upon the NR slider 63 returning to the neutral position, the relay levers 77N, 77R and the head moving sliders 81N, 81R are also returned to the neutral positions, whereby the head base 68 is unlocked from the playback position.

At the same time, since the eject relay lever 110 pivots counterclockwise, the joint pin 113 of the eject relay lever 110 is moved substantially to the right (in the direction of arrow C in FIG. 18) and pushes the right opening edge of the joint portion 96b' of the AMS slider 95 in the direction of arrow C. Correspondingly, the AMS slider 95 is moved in the direction of arrow C, causing the position restricting edge 98 of the AMS slider 95 to move away from the front side of the AMS position restricting lug 74 of the head base 68 in the direction of arrow C. As a result, the head base 68 is returned under the tensile force of the tension coil spring 73 to the stop position corresponding to the frontmost end of its movable range. As stated above, the lock member 115 is simultaneously moved rearward to release the lid 121 from the locked state.

As with the eject operation from the reverse playback mode, the eject operation from the forward playback mode also includes the additional operation of making the trigger lever 42 pivot clockwise. Pushing the eject lever 101 in the direction of arrow D therefore requires larger force in the eject operation from the forward playback mode than in the eject operation from the stop mode. In other words, the user feels heavier resistance in pushing the operating portion 102. A heavier feeling in performing the eject operation from the playback state contributes to preventing false operation.

The eject operation is performed, as explained above, by pushing the eject lever 101 in the direction of arrow D in FIGS. 16 to 18. Particularly, even if power is cut off due to, e.g., exhaustion of a battery, in the playback mode, a tape cassette can be removed by pushing the eject lever 101 in the direction of arrow D with no need of replacing the battery.

If the eject operation is performed during movement of the head base 68 in the transition state to any of the modes, the magnetic head 71 mounted on the head base 68 may be damaged. To avoid damage of the magnetic head 71, the mechanism is designed to disable the eject operation during movement of the head base 68, i.e., to prevent the eject lever 101 from being pushed in the direction of arrow D.

Figure 19:
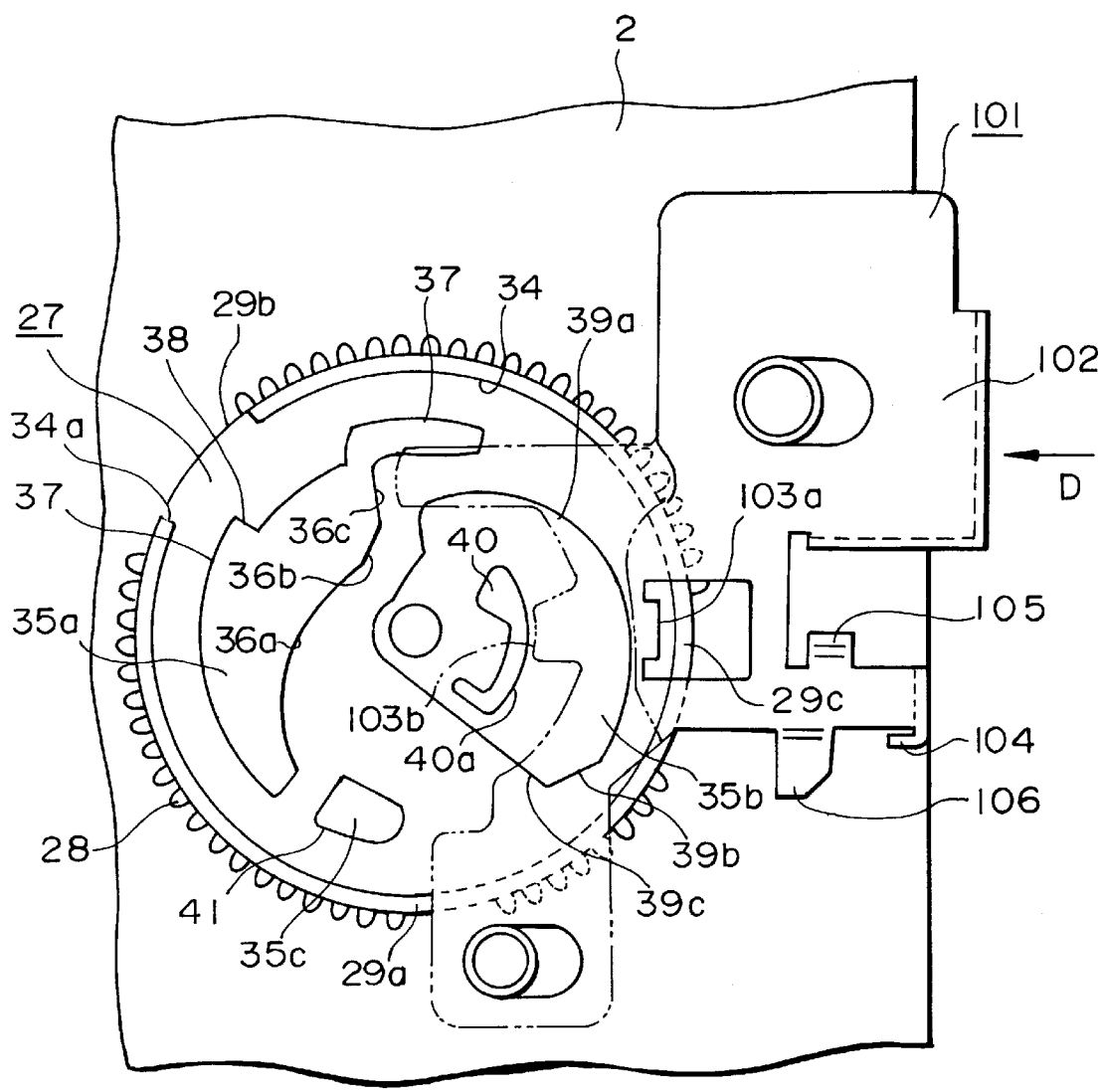
FIG. 19 is a plan view, partly omitted, of primary elements, the view illustrating a transition state from the stop mode to the reverse playback mode.

In the case of transition from the stop mode or the AMS mode to the reverse playback mode, as shown in FIG. 19, immediately after the cam gear 27 starts to rotate counterclockwise, the check surface 40a of the check boss 40 of the cam gear 27 is positioned just leftward of the stopper edge 103b of the eject lever 101. This condition of the check surface 40a of the check boss 40 lying on the left side of the stopper edge 103b in close relation continues until the cam gear 27 rotates to the next stop position. Accordingly, even when the user attempts to push the eject lever 101 in the direction of arrow D in FIG. 19, the stopper edge 103b strikes against the check boss 40 and the eject lever 101 cannot be pushed in the direction of arrow D.

Figure 20:
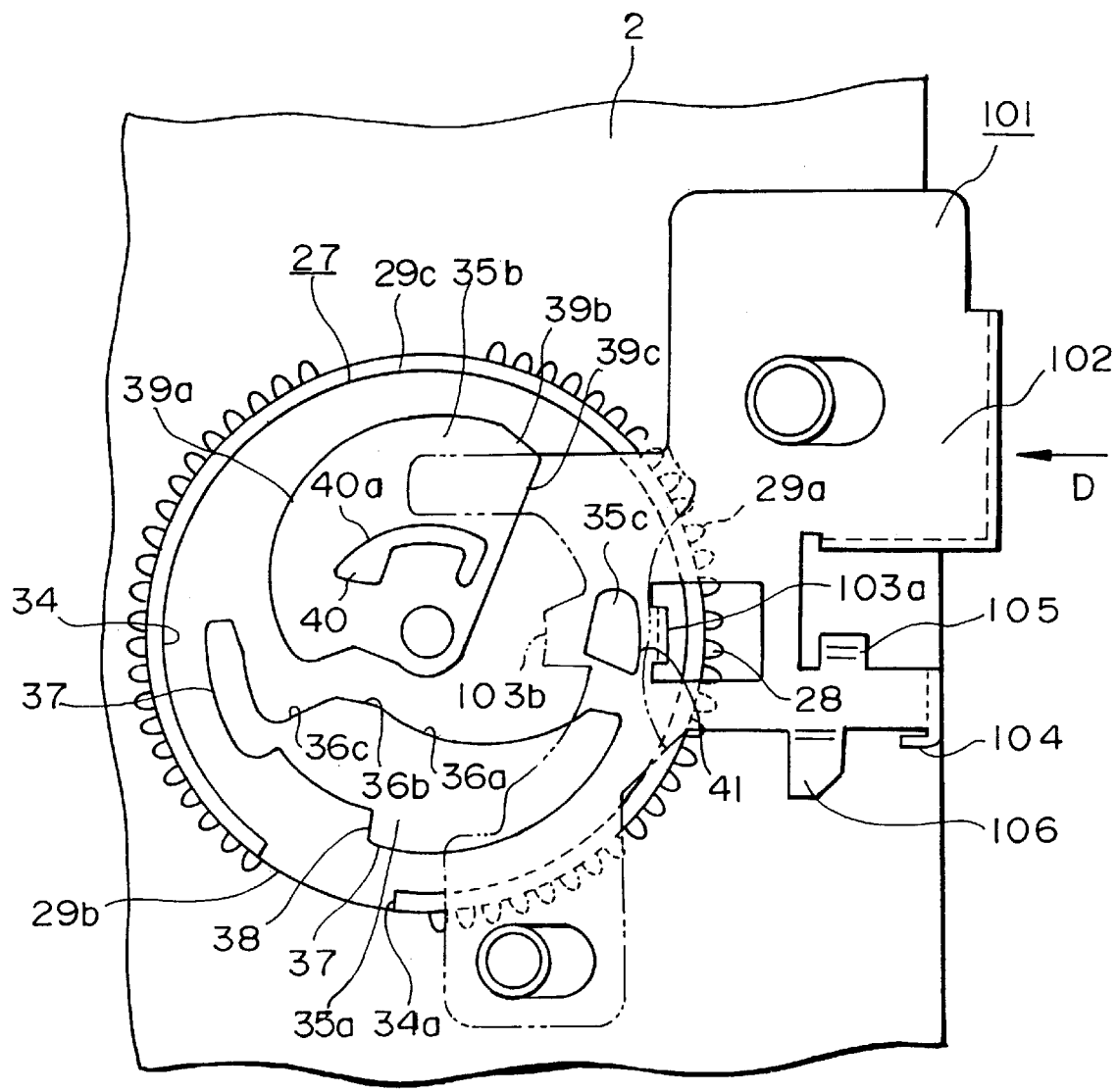
FIG. 20 is a plan view, partly omitted, of primary elements, the view illustrating a transition state from the reverse playback mode to the forward playback mode.

In the case of transition from the reverse playback mode to the forward playback mode, as shown in FIG. 20, immediately after the cam gear 27 starts to rotate counterclockwise, the check surface 41 of the projection 35c is positioned just leftward of the stopper lug 103a of the eject lever 101, and then the check surface 37 of the projection 35a is similarly positioned just leftward of the stopper lug 103a of the eject lever 101, thereby preventing the eject lever 101 in the direction of arrow D in FIG. 20 until the cam gear 27 rotates to the next stop position.

While the above embodiment of the present invention has been described in connection with, by way of example, a playback apparatus for use with a tape cassette, the present invention is not limited to the playback apparatus, but also applicable to a recording/playback apparatus or a recording apparatus for use with a tape cassette. It is a matter of course that the present invention can be modified in various ways without departing from the spirit and scope of the invention in a broad sense.

What is claimed is:

1. A magnetic recording and/or playback apparatus using a tape cassette in which a magnetic tape is accommodated, said apparatus comprising:

a magnetic head mounted on a head base, said head base being movable between a recording and/or playback position where said magnetic head contacts the magnetic tape in the tape cassette to record and/or play back information signals on and/or from the magnetic tape and a stop position where said magnetic head is spaced apart from the magnetic tape in the tape cassette;

a switching mechanism for switching over a running direction of the magnetic tape between a forward direction and a reverse direction; and a head moving mechanism for moving said head base between said recording and/or playback position and said stop position, said head moving mechanism including a pair of head moving sliders for respectively alternately moving said head base in said recording and/or playback position, wherein one of said pair of head moving sliders moves said head base into said recording and/or playback position from said stop position when said magnetic tape is running in the forward direction, and when the magnetic tape is switched over to run in the reverse direction by said switching mechanism, the other of said pair of(head moving sliders) moves said head base into said recording and/or playback position from said stop position, and said head mechanism further includes a pair of relay levers being pivotally mounted for transferring movement of said switching mechanism to said pair of head moving sliders for moving said head base in response to the running direction to the magnetic tape and said magnetic head is held in said recording and/or playback position by one of said pair of relay levers.

2. The magnetic recording and/or playback apparatus according to claim 1, wherein said switching mechanism includes a switching lever for switching over the running direction of the magnetic tape between said forward direction and said reverse direction and cooperating with said pair of relay levers, said switching lever being movable among a first position, a second position, and an intermediate position, wherein in said first position the running direction of the magnetic tape is switched over to said forward direction, said one of said pair of head moving sliders is operated to move said head base to said recording and/or playback position, in said second position the running direction of the magnetic tape is switched over to said reverse direction, said other of said pair of head moving sliders is operated to move said magnetic head base to said recording and/or playback position, and said head base is held in said recording and/or playback position by said other of said pair of relay levers, and wherein said intermediate position is between said first and second positions.

3. The magnetic recording and/or playback apparatus according to claim 2, wherein said head base is released from the state held by said pair of relay levers and said head base moves to said stop position when said switching lever is in said intermediate position.

4. The magnetic recording and/or playback apparatus according to claim 2, wherein said switching lever has a pair of pivotal movement operating members for selectively pivoting one of said pair of relay levers.

5. The magnetic recording and/or playback apparatus according to claim 1, further comprising: a body for receiving the tape cassette to be loaded therein and housing said magnetic head, said switching mechanism and said head moving mechanism therein; a lid pivotally attached to said body; a lock mechanism for locking said lid in a closed position with respect to said body; and an unlock mechanism for releasing said lid from the state locked by said lock mechanism and moving said head base to said stop position.

6. The magnetic recording and/or playback apparatus according to claim 5, comprising a disable mechanism for disabling a release operation of said unlock mechanism during the switching over of the running direction of the magnetic tape by said switching mechanism.

7. The magnetic recording and/or playback apparatus according to claim 6, wherein said switching mechanism includes:
- a switching lever cooperating with said pair of relay levers and being movable among a first position, a second position, and an intermediate position, wherein in said first position the running direction of the magnetic tape is switched over to said forward direction, in said second position the running direction of the magnetic tape is switched over to said reverse direction, and in said intermediate position said head base is moved to said stop position, said intermediate position being located between said first and second positions; and
- a cam member for moving said switching lever, and wherein said unlock mechanism includes:
    - a first unlock operating member for operating said cam member to move said switching lever to said intermediate position and move said head base to said stop position; and
    - a second unlock operating member operated by said first unlock operating member for releasing said lid from the state locked by said lock mechanism.

8. The magnetic recording and/or playback apparatus according to claim 7, wherein said disable mechanism is provided on said first unlock operating member and includes an engagement portion for engaging said cam member during the switching over of the running direction of the magnetic tape by said switching mechanism.

9. The magnetic recording and/or playback apparatus according to claim 7, wherein said unlock mechanism further includes a third unlock operating member operated by said first unlock operating member for rotating said cam member to move said switching lever to said intermediate position.

10. The magnetic recording and/or playback apparatus according to claim 1, wherein said switching mechanism includes a motor having a driving pulley mounted on a rotary shaft of said motor, a pair of capstans, a pair of pinch rollers cooperating with said pair of capstans to grip the magnetic tap therebetween for running the magnetic tape, a pair of flywheels provided respectively on said pair of capstans, an endless belt stretched around said driving pulley and said pair of flywheels, and an adjust mechanism for adjusting a tension of said endless belt, such that tension of said endless belt in a mode of running the magnetic tape at a high speed is weaker than the tension of said endless belt in a mode of running the magnetic tape at a low speed.

11. The magnetic recording and/or playback apparatus according to claim 10, wherein said adjust mechanism includes means for being operated by said switching mechanism.

12. The magnetic recording and/or playback apparatus according to claim 11, wherein said adjust mechanism further includes an adjust pulley around which said endless belt runs, a support member having one end to which said adjust pulley is attached, and an urging member for urging said support member in a direction to increase the tension of said endless belt, wherein the tension of said endless belt is adjusted upon said support member being operated by said switching mechanism.

13. The magnetic recording and/or playback apparatus according to claim 11, wherein said switching mechanism includes a switching lever being movable among a first position where the running direction of the magnetic tape is switched over to said forward direction, a second position where the running direction of the magnetic tape is switched over to said reverse direction, and an intermediate position where said head base is moved to said stop position, said intermediate position being located between said first and second positions, wherein said support member of said adjust mechanism is moved in a direction to reduce the tension of said endless belt when said switching lever is in one of said first position and said second position, and in a direction to increase the tension of said endless belt when said switching lever is in said intermediate position.

14. A magnetic recording and/or playback apparatus for using a tape cassette in which a magnetic tape is accommodated, said apparatus comprising:
- a magnetic head mounted on a head base that is movable between a recording and/or playback position where said magnetic head contacts the magnetic tape in the tape cassette to record and/or playback information signals on and/or from the magnetic tape and a stop position where said magnetic head is spaced apart from the magnetic tape in the tape cassette;
- a switching mechanism for switching over a running direction of the magnetic tape between a forward direction and a reverse direction;
- a body for receiving a tape cassette loaded therein and for housing said magnetic head and said switching mechanism therein;
- a lid pivotally attached to said body;
- a lock mechanism for locking said lid in a closed and locked position with respect to said body;
- an unlock mechanism for releasing said lid from the locked position and moving said head base to said stop position; and
- a disable mechanism for disabling a release operation of said unlock mechanism during switching over the running direction of the magnetic tape by said switching mechanism,
- wherein said switching mechanism includes: a switching lever being movable among a first position where the running direction of the magnetic tape is switched over to said forward direction, a second position where the running direction of the magnetic tape is switched over to said reverse direction, and an intermediate position where said head base is moved to said stop position, said intermediate position being located between said first and second positions; and a cam member for moving said switching lever, and wherein said unlock mechanism includes: a first unlock operation member for operating said cam member to move said switching lever to said intermediate position and move said head base to said stop position; and a second unlock operating member operated by said first unlock operating member for releasing said lid from the lock position, wherein said disable mechanism is arranged on said first unlock operating member and includes an engagement portion for engaging said cam member during the switching over of the running direction of the magnetic tape by said switching mechanism.

15. The magnetic recording and/or playback apparatus according to claim 14, wherein said unlock mechanism further includes a third unlock operating member operated by said first unlock operating member for rotating said cam member to move said switching lever to said intermediate position.

16. A magnetic recording and/or playback apparatus for using a tape cassette in which a magnetic tape is accommodated, said apparatus comprising:

a magnetic head mounted on a head base that is movable between a recording and/or playback position where said magnetic head contacts the magnetic tape in the tape cassette to record and/or play back information signals on and/or from the magnetic tape and a stop position where said magnetic head is spaced apart from the magnetic tape in the tape cassette;

a switching mechanism for switching over a running direction of the magnetic tape between a forward direction and a reverse direction;

a head moving mechanism for moving said head base between said recording and/or playback position and said stop position, said head moving mechanism including a pair of head moving sliders for moving said head base in said recording and/or playback position, wherein one of said pair of head moving sliders moves said head base into said recording and/or playback position from said stop position when said magnetic tape is running in the forward direction, and when the magnetic tape is run in the reverse direction by switching over said switching mechanism, the other of said pair of head moving sliders moves said head base in said recording and/or playback position from said stop position, and further including a pair of relay levers being pivotally mounted for transferring movement of said switching mechanism to said pair of head moving sliders for moving said head base in response to the running direction of the magnetic tape and said head base is held in said recording and/or playback position by one of said pair of relay levers;

an apparatus body for housing said magnetic head, said switching mechanism and said head moving mechanism therein, said tape cassette being loaded in said apparatus body;

a lid pivotally attached to said apparatus body;

a lock mechanism for locking said lid in a closed and locked position with respect to said apparatus body; and an unlock mechanism for releasing said lid from the locked position and moving said magnetic head to said stop position.

17. The magnetic recording and/or playback apparatus according to claim 16, wherein said apparatus further includes a disable mechanism for disabling a release operation from being carried out by said unlock mechanism during the switching over of the running direction of the magnetic tape made by said switching mechanism.

18. The magnetic recording and/or playback apparatus according to claim 16, wherein said switching mechanism includes a switching lever for switching over the running direction of the magnetic tape between said forward direction and said reverse direction and cooperating with said pair of relay levers, said switching lever being movable among a first position, a second position, and an intermediate position, wherein in said first position the running direction of the magnetic tape is switched over to said forward direction, said one of said pair of head moving sliders is operated to move said head base to said recording and/or playback position, wherein in said second position the running direction of the magnetic tape is switched over to said reverse direction, the other of said pair of head moving sliders is operated to move said head base to said recording and/or playback position, and said head base is held in said recording and/or playback position by said other of said pair of relay levers, and wherein said intermediate position is between said first and second positions.

19. The magnetic recording and/or playback apparatus according to claim 18, wherein said head base is released from being held by said pair of relay levers and moves said head base to said stop position when said switching lever is in said intermediate position.

20. The magnetic recording and/or playback apparatus according to claim 19, wherein said switching mechanism includes a cam member for moving said switching lever, and wherein said unlock mechanism includes a first unlock operating member for operating said cam member to move said switching lever to said intermediate position and to move said head base to said spaced position, and a second unlock operating member operated by said first unlock operating member for releasing said lid from the locked position.

21. The magnetic recording and/or playback apparatus according to claim 20, wherein said disable mechanism is arranged on said first unlock operating member and includes an engagement portion for engaging said cam member during the switching over of the running direction of the magnetic tape by said switching mechanism.

22. The magnetic recording and/or playback apparatus according to claim 21, wherein said unlock mechanism further includes a third unlock operating member operated by said first unlock operating member for rotating said cam member to move said switching lever to said intermediate position.

* * * * *